(12) United States Patent
Furuta et al.

(10) Patent No.: US 12,742,985 B2
(45) Date of Patent: Sep. 22, 2026

(54) LIGHT DIFFUSION SHEET, BACKLIGHT UNIT, LIQUID CRYSTAL DISPLAY APPARATUS, INFORMATION DEVICE, AND METHOD OF MANUFACTURING LIGHT DIFFUSION SHEET

(71) Applicant: KEIWA Incorporated, Tokyo (JP)

(72) Inventors: Akira Furuta, Tokyo (JP); Masayuki Sukigara, Tokyo (JP); Motohiko Okabe, Tokyo (JP); Yoshihiro Fukui, Tokyo (JP); Tomoko Kimura, Tokyo (JP)

(73) Assignee: KEIWA Incorporated, Tokyo (JP)

( * ) Notice: Subject to any disclaimer, the term of this patent is extended or adjusted under 35 U.S.C. 154(b) by 8 days.

(21) Appl. No.: 18/953,812

(22) Filed: Nov. 20, 2024

(65) Prior Publication Data

US 2025/0076701 A1 Mar. 6, 2025

Related U.S. Application Data

(63) Continuation of application No. PCT/JP2023/019378, filed on May 24, 2023.

(30) Foreign Application Priority Data

May 27, 2022 (JP) ................................ 2022-087114
May 22, 2023 (JP) ................................ 2023-083829

(51) Int. Cl.
*G02B 5/02* (2006.01)
*G02F 1/1335* (2006.01)
*G02F 1/13357* (2006.01)

(52) U.S. Cl.
CPC .. *G02F 1/133507* (2021.01); *G02F 1/133605* (2013.01)

(58) Field of Classification Search
CPC .... G02B 5/02; G02B 5/0268; G02F 1/133606
(Continued)

(56) References Cited

U.S. PATENT DOCUMENTS

2003/0035231 A1 2/2003 Epstein et al.
2003/0058553 A1 3/2003 Epstein et al.
(Continued)

FOREIGN PATENT DOCUMENTS

EP 4246192 9/2023
JP 2000292790 A * 10/2000
(Continued)

OTHER PUBLICATIONS

Machine_English_translation_JP_2010160438_A; Takizawa, Lens Sheet, Back Light Unit and Display Apparatus; Jul. 22, 2010; EPO; whole document (Year: 2026).*
(Continued)

*Primary Examiner* — Tahseen Khan
(74) *Attorney, Agent, or Firm* — JCIPRNET

(57) ABSTRACT

A light-diffusing sheet includes a plurality of depressed portions formed in an approximately inverted polygonal pyramid on at least a first surface. Ridgelines that partition the plurality of depressed portions have a depressed shape between intersections of the ridgelines with respect to straight lines that connect the intersections. When an array pitch of the plurality of depressed portions is denoted by P and a dimension occupied by a curved portion of a vertex of each of the ridgelines in an array direction of the plurality of depressed portions is denoted by Wr, a ratio Wr/P is 0.3 or lower. A maximum height difference d between the straight lines connecting the intersections of the ridgelines and the ridgelines is 1 μm or more and 10 μm or less. The plurality
(Continued)

of depressed portions include a depressed portion of which a vertex of the approximately inverted polygonal pyramid is formed in a linear shape.

19 Claims, 21 Drawing Sheets

(58) Field of Classification Search
USPC .......................................................... 428/156
See application file for complete search history.

(56) References Cited

U.S. PATENT DOCUMENTS

2005/0024754 A1 2/2005 Epstein et al.
2008/0049341 A1 2/2008 Epstein et al.
2009/0316430 A1* 12/2009 Chuang .................. G02B 5/045 362/606
2010/0124047 A1* 5/2010 Ahn .................. G02F 1/133603 362/97.3
2012/0080710 A1 4/2012 Inoue et al.
2014/0293190 A1* 10/2014 Nakashima .......... G02B 6/0043 362/624
2015/0179981 A1 6/2015 Inoue et al.
2015/0234113 A1* 8/2015 Nakashima .......... G02B 6/0036 362/619
2015/0234114 A1* 8/2015 Nakashima .......... G02B 6/0036 362/619
2016/0215165 A1* 7/2016 Arakawa .................... C08J 5/18
2018/0207907 A1* 7/2018 Okabe .................. G02B 5/0226

FOREIGN PATENT DOCUMENTS

JP 2004-538506 A 12/2004
JP 2007178705 7/2007
JP 2010-117707 A 5/2010
JP 2010160438 A * 7/2010
JP 2011-029163 A 2/2011
JP 2011-076115 A 4/2011
JP 2011-227231 A 11/2011
JP 2012-047912 A 3/2012
JP 2013-225058 A 10/2013
KR 10-2010-0042593 4/2010
KR 10-2012-0031266 4/2012
TW 202138194 A * 10/2021 ....... G02F 1/133606
WO 2022118533 6/2022

OTHER PUBLICATIONS

Machine_English_translation_TW_202138194_A; Tsai et. al., Light-Diffusing Laminate backlight unit and liquid crystal display device ; Oct. 16, 2021; EPO; whole document (Year: 2026).*
Machine_English_translation_JP_2000292790_A; Okabe, Light Diffusion Shet and Back Light Unit using same; Oct. 20, 2000; EPO; whole document (Year: 2026).*
"Search Report of Europe Counterpart Application", issued on Jul. 2, 2025, pp. 1-10.

* cited by examiner

Fig. 5
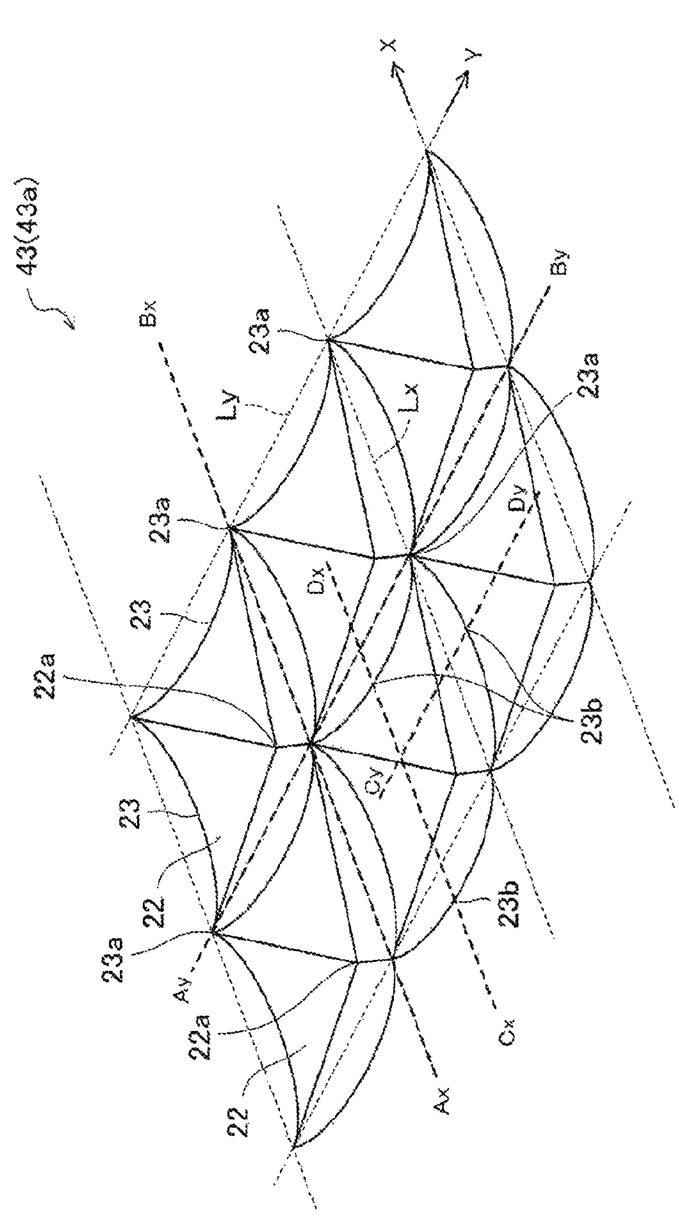
43(43a)
X
Y
Bx
By
Lx
Ly
Dx
Dy
Cx
Cy
Ax
Ay
23a
23a
23a
23a
23a
22a
22a
23
23
22
22
23b
23b (A)

Figure 19:
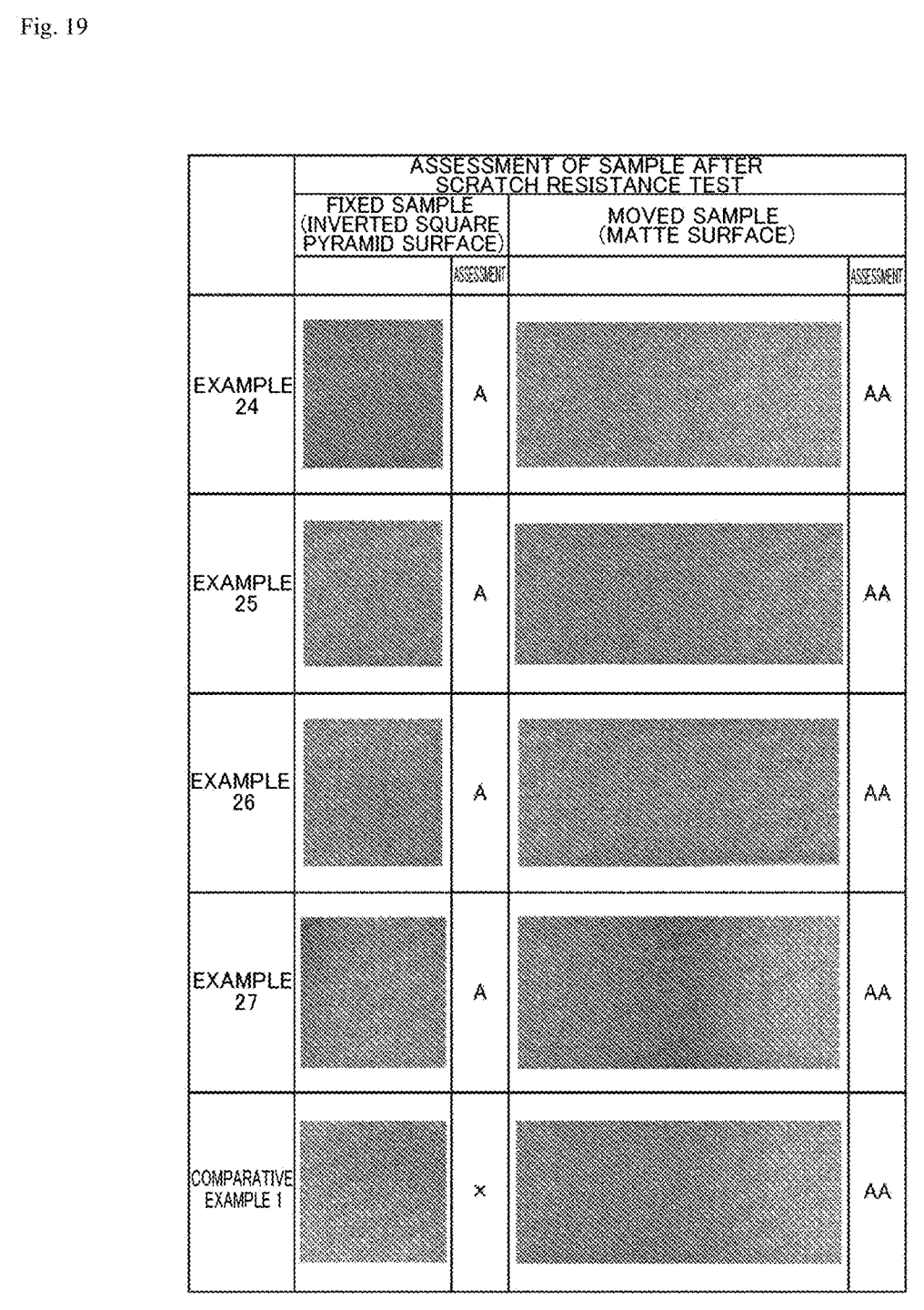

| | ASSESSMENT OF SAMPLE AFTER SCRATCH RESISTANCE TEST | | | |
|---|---|---|---|---|
| | FIXED SAMPLE (INVERTED SQUARE PYRAMID SURFACE) | | MOVED SAMPLE (MATTE SURFACE) | |
| | | ASSESSMENT | | ASSESSMENT |
| EXAMPLE 24 | | A | | AA |
| EXAMPLE 25 | | A | | AA |
| EXAMPLE 26 | | A | | AA |
| EXAMPLE 27 | | A | | AA |
| COMPARATIVE EXAMPLE 1 | | × | | AA |

LIGHT DIFFUSION SHEET, BACKLIGHT UNIT, LIQUID CRYSTAL DISPLAY APPARATUS, INFORMATION DEVICE, AND METHOD OF MANUFACTURING LIGHT DIFFUSION SHEET

CROSS REFERENCE TO RELATED APPLICATIONS

This application is a bypass continuation of International Application No. PCT/JP2023/019378, filed May 24, 2023, which international application claims priority to and the benefit of Japanese Application No. 2022-087114, filed May 27, 2022 and Japanese Application No. 2023-083829, filed May 22, 2023; the contents of all of which are hereby incorporated by reference herein in their respective entireties.

BACKGROUND

Technical Field

The present disclosure relates to a light-diffusing sheet, a backlight unit, a liquid crystal display device, an information apparatus, and a method of manufacturing a light-diffusing sheet.

Description of Related Art

In recent years, liquid crystal display devices (hereinafter, also referred to as liquid crystal displays) are widely used as display devices of various information apparatuses including smartphones and tablet terminals. As backlights of liquid crystal displays, direct-type systems in which a light source is arranged on a rear surface of a liquid crystal panel or edge light systems in which a light source is arranged in a vicinity of a side surface of a liquid crystal panel are predominantly used.

When adopting a direct-type backlight, a light-diffusing member (a light-diffusing plate, a light-diffusing sheet, or a light-diffusing film) is used in order to erase an image of a light source such as an LED (Light Emitting Diode) and increase uniformity of in-plane brightness on a light-emitting surface.

In a direct-type backlight disclosed in Japanese Patent Application Publication No. 2010-117707, a light-diffusing plate provided with a plurality of depressed portions with an inverted polygonal pyramid shape (inverted pyramid shape) or an inverted truncated polygonal pyramid shape is used in order to improve brightness uniformity. Japanese Patent Application Publication No. 2010-117707 discloses, in a stacked structure of a light-diffusing plate and another optical film, making an inside surface of each depressed portion of the light-diffusing plate into a curved surface of which a center of curvature is positioned on a side of a depth direction of the depressed portion in an opening edge part in order to prevent the light-diffusing plate and the other optical film from becoming worn and damaged due to vibration during transportation.

SUMMARY

However, with the direct-type backlight disclosed in Japanese Patent Application Publication No. 2010-117707, damage to the light-diffusing plate and the other optical film cannot be sufficiently suppressed.

In consideration thereof, an object of the present disclosure is to provide a light-diffusing sheet that is less susceptible to damage even when stacked while improving brightness uniformity.

In order to achieve the object described above, a light-diffusing sheet according to the present disclosure includes a plurality of depressed portions formed in an approximately inverted polygonal pyramid on at least a first surface. Ridgelines that partition the plurality of depressed portions have a depressed shape between intersections of the ridgelines with respect to straight lines that connect the intersections. When an array pitch of the plurality of depressed portions is denoted by P and a dimension occupied by a curved portion of a vertex of each of the ridgelines in an array direction of the plurality of depressed portions is denoted by Wr, a ratio Wr/P is 0.3 or lower. A maximum height difference d between the straight line and the ridgelines is 1 μm or more and 10 μm or less. The plurality of depressed portions include a depressed portion of which a vertex of the approximately inverted polygonal pyramid is formed in a linear shape.

With the light-diffusing sheet according to the present disclosure, since the light-diffusing sheet includes a plurality of depressed portions formed in an approximately inverted polygonal pyramid on at least a first surface, brightness uniformity can be improved. In addition, while the ridgelines (an opening edge of the depressed portions) that partition the depressed portions cause abrasion and damage, the ridgelines have a depressed shape between the intersections of the ridgelines. Therefore, abrasion and damage are less likely to occur even when the light-diffusing sheet is used by being stacked with other optical sheets or other light-diffusing sheets. In addition, the dimension Wr occupied by the curved portion of a vertex of each of the ridgelines in the array direction of the depressed portions is kept to or under 30% of the array pitch P of the depressed portions. Therefore, since the vertex of the ridgelines can maintain a steep shape, brightness uniformity does not readily decline even when the ridgelines are depressed between the intersections of the ridgelines. Furthermore, since the maximum height difference d between a straight line connecting the intersections of the ridgelines and the ridgelines is set to 1 μm or more, scratch resistance is improved and, at the same time, since the maximum height difference d is set to 10 μm or less, a decline in brightness uniformity can be suppressed. Moreover, since the vertex of the approximately inverted polygonal pyramid (in other words, a bottom part of the depressed portions) is formed in a linear shape, mass production of the light-diffusing sheet of which brightness uniformity is prevented from declining can be readily performed.

While the expression "approximately inverted polygonal pyramid" is used in consideration of the fact that it is difficult to form depressed portions of a geometrically-strict inverted polygonal pyramid using ordinary shape transfer techniques in the light-diffusing sheet according to the present disclosure, it is needless to say that the expression includes a true inverted polygonal pyramid and shapes that are substantially an inverted polygonal pyramid.

In addition, while the ridgelines preferably have a depressed shape between all intersections of the ridgelines in the light-diffusing sheet according to the present disclosure, it is not essential for the ridgelines to have a depressed shape between all intersections. In other words, the ridgelines need not have a depressed shape between parts of the intersections.

Furthermore, in the present disclosure, a "light-diffusing sheet" is to include a "light-diffusing plate" with a plate shape and a "light-diffusing film" with a film shape.

Moreover, in the present disclosure, an "optical sheet" means a sheet that has various optical functions such as diffusion, condensing, refraction, and reflection and a "light-diffusing sheet" is one of such "optical sheets".

In the light-diffusing sheet according to the present disclosure, when the maximum height difference d is 1.5 μm or more and 7 μm or less, both scratch resistance and brightness uniformity can be further improved. In this case, when the maximum height difference d is 2.5 μm or more and 5 μm or less, both scratch resistance and brightness uniformity can be even further improved.

In the light-diffusing sheet according to the present disclosure, when the ratio Wr/P is 0.2 or lower, brightness uniformity can be further improved. In this case, when the ratio Wr/P is 0.1 or lower, brightness uniformity can be even further improved.

In the light-diffusing sheet according to the present disclosure, when the array pitch P is 50 μm or more and 500 μm or less and an angle formed between a wall surface of the plurality of depressed portions (in other words, inclined surfaces of the approximately inverted polygonal pyramids) and a sheet surface of the light-diffusing sheet is 40 degrees or more and 65 degrees or less, brightness uniformity can be improved.

In the light-diffusing sheet according to the present disclosure, when the ridgeline is depressed in an approximately parabolic shape, an approximately arc shape, an approximately triangular shape, or an approximately trapezoidal shape between the intersections, scratch resistance can be improved.

In the light-diffusing sheet according to the present disclosure, the plurality of depressed portions may be formed in an approximately inverted square pyramid. In this case, the ridgelines may extend in a first direction and a second direction. In addition, the maximum height difference d may be an average value of a maximum height difference dx between the straight lines and the ridgelines in the first direction and a maximum height difference dy between the straight lines and the ridgelines in the second direction. Furthermore, the array pitch P may be an average value of an array pitch Px of the plurality of depressed portions in the first direction and an array pitch Py of the plurality of depressed portions in the second direction. Moreover, the dimension Wr may be an average value of a dimension Wrx occupied by a curved portion of a vertex of each of the ridgelines in the first direction and a dimension Wry occupied by a curved portion of a vertex of each of the ridgelines in the second direction. Accordingly, a light-diffusing sheet with superior scratch resistance and brightness uniformity can be readily manufactured.

In the light-diffusing sheet according to the present disclosure, when the plurality of depressed portions are only provided on the first surface and a second surface is a matte surface, brightness uniformity can be further improved while suppressing abrasion and damage on the second surface.

In the light-diffusing sheet according to the present disclosure, a ratio of depressed portions of which the vertex is formed in a linear shape among the plurality of depressed portions may be 10% or more. Alternatively, the ratio may be 20% or more, 30% or more, 40% or more, 50% or more, 60% or more, 70% or more, 80% or more, 90% or more, or 100%.

A backlight unit according to the present disclosure is a backlight unit which is built into a liquid crystal display device and which guides light emitted by a light source toward a display screen and includes the light-diffusing sheet according to the present disclosure described earlier between the display screen and the light source.

Since the backlight unit according to the present disclosure includes the light-diffusing sheet according to the present disclosure described earlier, brightness uniformity can be improved and, at the same time, damage can be suppressed even when the light-diffusing sheet and other optical sheets are stacked.

In the backlight unit according to the present disclosure, when the light source is arranged on a reflecting sheet provided on an opposite side to the display screen as viewed from the light-diffusing sheet, brightness uniformity is even further improved.

In the backlight unit according to the present disclosure, the light-diffusing sheet may be stacked in plurality (for example, three or more sheets) and arranged between the display screen and the light source. Accordingly, brightness uniformity is further improved. In a case where three or more sheets of the light-diffusing sheet are stacked, when the light-diffusing sheet closest to the display screen contains a diffusing agent but the other light-diffusing sheets substantially do not contain the diffusing agent, brightness uniformity is even further improved.

A liquid crystal display device according to the present disclosure includes the backlight unit according to the present disclosure described earlier and a liquid crystal display panel.

Since the liquid crystal display device according to the present disclosure includes the backlight unit according to the present disclosure described earlier, brightness uniformity can be improved and, at the same time, damage can be suppressed even when the light-diffusing sheet and other optical sheets are stacked.

An information apparatus according to the present disclosure includes the liquid crystal display device according to the present disclosure described earlier.

Since the information apparatus according to the present disclosure includes the liquid crystal display device according to the present disclosure described earlier, brightness uniformity can be improved and, at the same time, damage can be suppressed even when the light-diffusing sheet and other optical sheets are stacked.

A method of manufacturing a light-diffusing sheet according to the present disclosure is a method of manufacturing the light-diffusing sheet according to the present disclosure described earlier, wherein the light-diffusing sheet is subjected to extrusion molding at a line rate of 10 m/minute or more and 30 m/minute or less and compressible linear pressure of 100 kgf/cm or more and 500 kgf/cm or less.

With the method of manufacturing a light-diffusing sheet according to the present disclosure, since the dimension Wr occupied by the curved portion of the vertex of the ridgelines in the array direction of the depressed portions can be kept to or under 30% of the array pitch P of the depressed portions, a light-diffusing sheet of which a shape of the vertex of the ridgelines is steep and which has superior brightness uniformity can be manufactured.

In addition, with the method of manufacturing a light-diffusing sheet according to the present disclosure, the maximum height difference d between the straight lines that connects intersections of the ridgelines and the ridgelines can be set to 1 μm or more and 10 μm or less. In other words, a light-diffusing sheet in which the ridgelines are depressed between the intersections of the ridgelines and elevated at portions of the intersections of the ridgelines is obtained. Therefore, even when the light-diffusing sheet and other optical sheets are stacked, since the ridgelines are less likely to come into contact with the other optical sheets between the intersections of the ridgelines, abrasion and damage are less likely to occur, and since the ridgelines come into point contact with the other optical sheets at the intersections of the ridgelines, slippage is created and reduces abrasion and damage. As a result, a light-diffusing sheet with superior scratch resistance can be manufactured.

Furthermore, with the method of manufacturing a light-diffusing sheet according to the present disclosure, since extrusion molding is used, the light-diffusing sheet according to the present disclosure described earlier can be manufactured at low cost.

In order to achieve the object described above, a light-diffusing sheet according to another aspect of the present disclosure includes a plurality of depressed portions formed in an approximately inverted polygonal pyramid on at least a first surface. Ridgelines that partition the plurality of depressed portions have a depressed shape between intersections of the ridgelines with respect to the straight lines that connect the intersections. When an array pitch of the plurality of depressed portions is denoted by P and a dimension occupied by a curved portion of a vertex of each of the ridgelines in an array direction of the plurality of depressed portions is denoted by Wr, a ratio Wr/P is 0.3 or lower. A maximum height difference d between the straight lines and the ridgelines is 1 μm or more and 10 μm or less. The plurality of depressed portions include a depressed portion of which a vertex of the approximately inverted polygonal pyramid is formed in a rectangular shape.

With the light-diffusing sheet according to the other aspect of the present disclosure, since the light-diffusing sheet includes a plurality of depressed portions formed in an approximately inverted polygonal pyramid on at least a first surface, brightness uniformity can be improved. In addition, while the ridgelines (an opening edge of the depressed portions) that partition the depressed portions cause abrasion and damage, the ridgelines have a depressed shape between the intersections of the ridgelines. Therefore, abrasion and damage are less likely to occur even when the light-diffusing sheet is used by being stacked with other optical sheets or other light-diffusing sheets. In addition, the dimension Wr occupied by the curved portion of a vertex of each of the ridgelines in the array direction of the depressed portions is kept to or under 30% of the array pitch P of the depressed portions. Therefore, since the vertex of the ridgelines can maintain a steep shape, brightness uniformity does not readily decline even when the ridgelines are depressed between the intersections of the ridgelines. Furthermore, since the maximum height difference d between the straight lines connecting the intersections of the ridgelines and the ridgelines is set to 1 μm or more, scratch resistance is improved and, at the same time, since the maximum height difference d is set to 10 μm or less, a decline in brightness uniformity can be suppressed. Moreover, since the vertex of the approximately inverted polygonal pyramid (in other words, a bottom part of the depressed portions) is formed in a rectangular shape, mass production of the light-diffusing sheet of which brightness uniformity is prevented from declining can be readily performed.

According to the present disclosure, a light-diffusing sheet that is less susceptible to damage even when stacked with other optical sheets while improving brightness uniformity can be provided.

BRIEF DESCRIPTION OF THE DRAWINGS

FIG. 5 is a perspective view showing an enlargement of depressed portions formed on the light-diffusing sheet according to the embodiment.

FIG. 19 is a diagram showing a result of performing a scratch resistance test with respect to each sample of the examples and the comparative examples.

DETAILED DESCRIPTION

Embodiment

Hereinafter, an embodiment of the present disclosure will be described with reference to the drawings. It should be noted that the scope of the present disclosure is not limited to the embodiment described below and any modifications can be made without departing from the scope of technical ideas of the present disclosure.

<Liquid Crystal Display Device>

Figure 1:
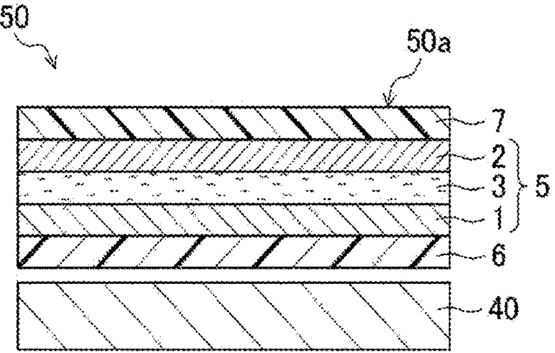
FIG. 1 is a sectional view of a liquid crystal display device according to an embodiment.

As shown in FIG. 1, a liquid crystal display device 50 according to the present embodiment includes a liquid crystal display panel 5, a first polarizing plate 6 which is pasted to a bottom surface of the liquid crystal display panel 5, a second polarizing plate 7 which is pasted to a top surface of the liquid crystal display panel 5, and a backlight unit 40 which is provided via the first polarizing plate 6 on a rear surface side of the liquid crystal display panel 5. The liquid crystal display panel 5 includes a TFT substrate 1 and a CF substrate 2 which are provided so as to face each other, a liquid crystal layer 3 which is provided between the TFT substrate 1 and the CF substrate 2, and a seal material (not illustrated) which is provided in a frame shape between the TFT substrate 1 and the CF substrate 2 in order to seal the liquid crystal layer 3.

While a shape of a display screen 50*a* of the liquid crystal display device 50 as viewed from front (above in FIG. 1) is generally a rectangle or a square, the shape is not limited thereto and may be any shape such as a shape of a rectangle with rounded corners, a shape of an ellipse, a shape of a circle, a shape of a trapezoid, or a shape of an instrument panel of an automobile.

In the liquid crystal display device 50, an image is displayed by applying a voltage of a predetermined magnitude to the liquid crystal layer 3 to change a state of alignment of the liquid crystal layer 3, adjusting transmittance of light incident via the first polarizing plate 6 from the backlight unit 40, and emitting the light via the second polarizing plate 7 in each sub-pixel corresponding to each pixel electrode.

The liquid crystal display device 50 according to the present embodiment is used as a display device to be built into various information apparatuses (for example, a vehicle-mounted device for car navigation or the like, a personal computer, a mobile phone, a portable information terminal, a portable game machine, a copy machine, a ticket vending machine, and an automated teller machine).

For example, the TFT substrate 1 includes a plurality of TFTs provided in a matrix pattern on a glass substrate, an interlayer insulating film provided so as to cover each TFT, a plurality of pixel electrodes provided in a matrix pattern on the interlayer insulating film and respectively connected to the plurality of TFTs, and an alignment film provided so as to cover each pixel electrode. For example, the CF substrate 2 includes a black matrix provided in a grid pattern on a glass substrate, a color filter including a red layer, a green layer, and a blue layer respectively provided between the respective grids of the black matrix, a common electrode provided so as to cover the black matrix and the color filter, and an alignment film provided so as to cover the common electrode. The liquid crystal layer 3 is constituted of a nematic liquid crystal material or the like containing liquid crystal molecules with electro-optic characteristics. For example, the first polarizing plate 6 and the second polarizing plate 7 include a polarizer layer with a polarizing axis in one direction and a pair of protection layers provided so as to sandwich the polarizer layer.

<Backlight Unit>

Figure 2:
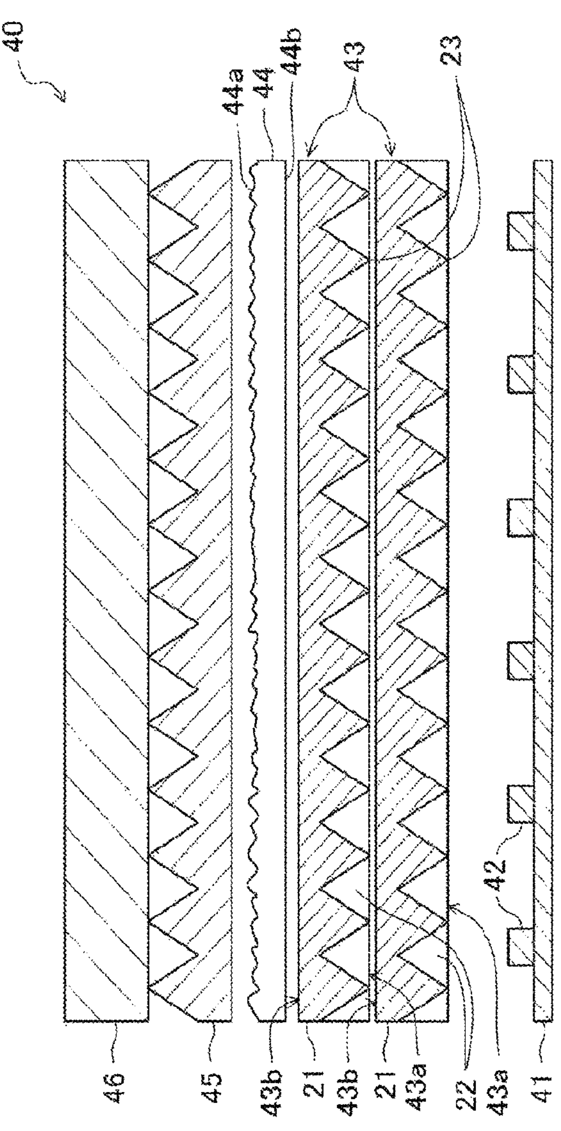
FIG. 2 is a sectional view of a backlight unit according to the embodiment.

As shown in FIG. 2, the backlight unit 40 according to the present embodiment includes a reflecting sheet 41, a plurality of small light sources 42 that are arranged in a two-dimensional shape on the reflecting sheet 41, a stack of first light-diffusing sheets 43 provided above the plurality of small light sources 42, a second light-diffusing sheet 44 provided above the stack of the first light-diffusing sheets 43, and a first prism sheet 45 and a second prism sheet 46 provided in order above the second light-diffusing sheet 44. In the present example, the stack of the first light-diffusing sheets 43 is constructed by stacking two layers of the first light-diffusing sheets 43 with a same structure. Although not illustrated, a polarizing sheet may be provided above the second prism sheet 46.

For example, the reflecting sheet 41 is constituted of a film made of white polyethylene terephthalate resin, a sliver-deposited film, or the like.

Figure 3:
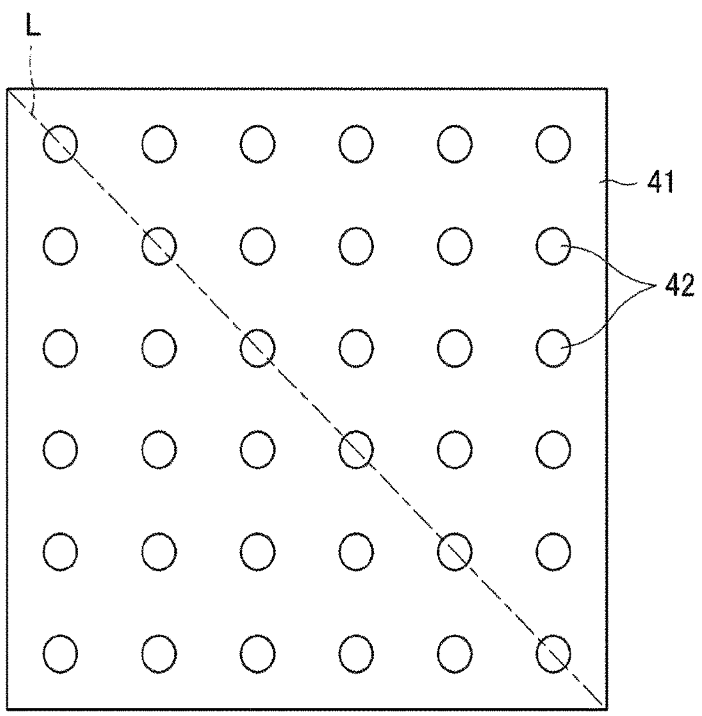
FIG. 3 is a plan view showing an arrangement example of a light source in the backlight unit shown in FIG. 2.

While a type of the small light sources 42 is not particularly limited, for example, the small light sources 42 may be LED elements, laser elements, or the like and LED elements may be used from the perspectives of cost, productivity, and the like. A lens may be mounted to the LED elements to be used as the small light sources 42 in order to adjust emission angle characteristics of the LED elements. For example, as shown in FIG. 3, the plurality of small light sources 42 made of LED elements of several mm square are arranged in a two-dimensional array shape at constant intervals. The small light sources 42 may have a rectangular shape in a plan view and, in such a case, a length of one side may be 10 μm or more (preferably, 50 μm or more) and 20 mm or less (preferably 10 mm or less and more preferably 5 mm or less).

In addition, while the number of arranged small light sources 42 is also not particularly limited, when the plurality of small light sources 42 are to be arranged in a distributed manner, the small light sources 42 are preferably regularly arranged on the reflecting sheet 41. Regularly arranged means arranged with certain regularity and, for example, arranging the small light sources 42 at equal intervals constitutes arranging regularly. When the small light sources 42 are to be arranged at equal intervals, a center-to-center distance between two adjacent small light sources 42 may be 0.5 mm or more (preferably, 2 mm or more) and 20 mm or less.

Figure 4:
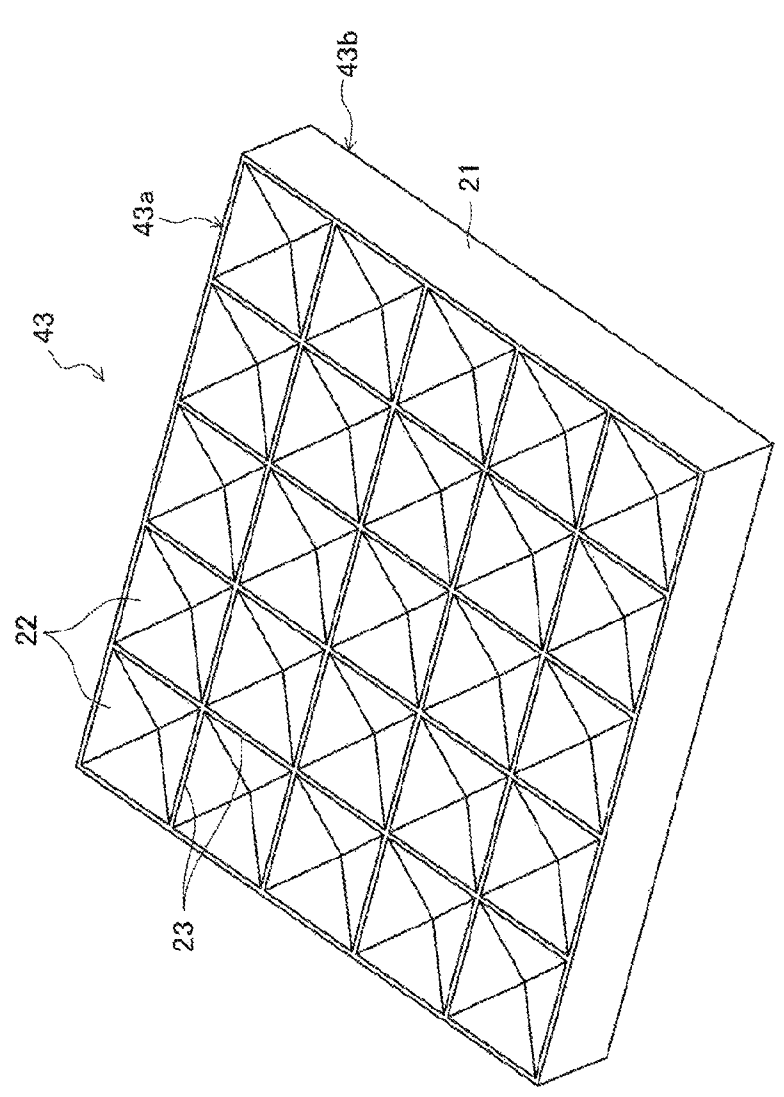
FIG. 4 is a perspective view of a light-diffusing sheet according to the embodiment.

Each first light-diffusing sheet 43 includes a base material layer 21. A plurality of depressed portions 22 are provided on a first surface (a surface opposing the small light sources 42) 43*a* of the first light-diffusing sheet 43. The plurality of depressed portions 22 are formed in an approximately inverted polygonal pyramid. In the present example, the plurality of depressed portions 22 are formed in an approximately inverted right square pyramid. Depressed portions 22 that are adjacent to each other are partitioned by ridgelines 23. An array pitch of the plurality of depressed portions 22 is, for example, around 50 μm or more and around 500 μm or less. An angle formed between a wall surface of the depressed portions 22 (an inclined surface of the approximately inverted polygonal pyramid) and a sheet surface (a virtual mirror surface without the depressed portions 22) of the first light-diffusing sheet 43 is set to, for example, 40 degrees or more and 65 degrees or less. In other words, a vertex angle of the depressed portions 22 is set to, for example, 50 degrees or more and 100 degrees or less. While a second surface 43*b* of the first light-diffusing sheet 43 may be a mirror surface, the second surface 43*b* is preferably a matte surface in order to improve diffusivity. FIG. 4 illustrates a situation where depressed portions 22 formed in an approximately inverted right square pyramid are arranged in a 5×5 matrix pattern on the first surface 43*a* of the first light-diffusing sheet 43.

While the base material layer 21 is constructed using, for example, a polycarbonate as a base material (matrix resin) and preferably does not contain a diffusing agent, the base material layer 21 may contain up to, for example, around 0.1 to 4 percent by mass of the diffusing agent per 100 percent by mass of the base material. Known materials can be appropriately used as the diffusing agent. While the first light-diffusing sheet 43 has a one-layer structure of the base material layer 21 in the present example, alternatively, the first light-diffusing sheet 43 may have a structure of two layers or more including a layer on which the depressed portions 22 are formed.

The second light-diffusing sheet 44 may include a matte surface on a first surface (a surface that opposes the first prism sheet 45) 44*a* and a mirror surface or depressed portions formed in an approximately inverted right square pyramid on a second surface 44*b*. The second light-diffusing sheet 44 is constructed using, for example, a polycarbonate as a base material (matrix resin) and preferably contains a diffusing agent and, for example, the second light-diffusing sheet 44 may contain around 0.5 to 4 percent by mass of the diffusing agent per 100 percent by mass of the base material. The second light-diffusing sheet 44 is constructed by, for example, mixing 1 part by mass of a silicone composite powder (average particle size 2.0 μm) as a diffusing agent per 99 parts by mass of an aromatic polycarbonate resin.

The first prism sheet 45 and the second prism sheet 46 are, for example, films formed such that a plurality of groove lines with an isosceles triangular cross-section are adjacent to each other and a vertex angle of a prism sandwiched between a pair of adjacent groove lines is around 90 degrees. In this case, each groove line formed on the first prism sheet 45 and each groove line formed on the second prism sheet 46 are arranged so as to be orthogonal to each other. The first prism sheet 45 and the second prism sheet 46 may be integrally formed. For example, a PET (polyethylene terephthalate) film given prism shapes using a UV-curable acrylic resin may be used as the first prism sheet 45 and the second prism sheet 46.

Although not illustrated, when a polarizing sheet is provided above the second prism sheet 46, for example, the DBEF series manufactured by 3M may be used as the polarizing sheet. The polarizing sheet improves brightness of the display screen 50*a* by preventing light emitted from the backlight unit 40 from being absorbed by the first polarizing plate 6 of the liquid crystal display device 50.

<Detailed Configuration of Light-Diffusing Sheet>

While the plurality of depressed portions 22 are formed on the first surface (the surface opposing the small light sources 42) 43*a* of the first light-diffusing sheet 43 in the example shown in FIG. 2, in addition thereto or in place thereof, other depressed portions similar to the depressed portions 22 may also be formed in plurality on the second surface 43*b* of the first light-diffusing sheet 43.

The plurality of depressed portions 22 may be formed in an approximately inverted polygonal pyramid. The plurality of depressed portions 22 may be regularly two-dimensionally arrayed. As an “inverted polygonal pyramid”, a triangular pyramid, a square pyramid, or a hexagonal pyramid that can be two-dimensionally arranged in a seamless manner is preferable. While a die (metal roll) is used in manufacturing steps such as extrusion molding and injection molding when providing the depressed portions 22, an inverted square pyramid may be selected as the “inverted polygonal pyramid” in consideration of accuracy of cutting operations of a surface of the die (metal roll).

While the expression “approximately inverted polygonal pyramid” is used in consideration of the fact that it is difficult to form depressed portions of a geometrically-strict inverted polygonal pyramid using ordinary shape transfer techniques, it is needless to say that the expression includes a true inverted polygonal pyramid and shapes that are substantially an inverted polygonal pyramid. In addition, “approximately” means “can be approximated” and, for example, an “approximate square pyramid” refers to a shape that can be approximated to a square pyramid. Furthermore, shapes having deformed from an “inverted polygonal pyramid” within a range of inevitable variability of shapes attributable to machining accuracy in industrial production are also included in an “approximately inverted polygonal pyramid”.

When a plurality of depressed portions 22 are regularly two-dimensionally arrayed, the plurality of depressed portions 22 may be seamlessly provided over an entire surface of the first light-diffusing sheet 43 or may be provided at constant intervals (pitch).

The first light-diffusing sheet 43 may be constituted of the base material layer 21 not including a diffusing agent such as the base material layer 21 made of a clear polycarbonate. When the base material layer 21 is to contain a diffusing agent, while a material of the diffusing agent is not particularly limited, inorganic particles of silica, titanium oxide, aluminum hydroxide, barium sulfate, or the like or organic particles of acrylic, acrylonitrile, silicone, polystyrene, polyamide, or the like may be used. A particle size of the diffusing agent may be set to, for example, 0.1 μm or more (preferably, 1 μm or more) and 10 μm or less (preferably, 8 μm or less) from the perspective of a light-diffusing effect. While the first light-diffusing sheet 43 preferably does not include a diffusing agent from the perspectives of an effect of reflection and refraction by the approximately inverted polygonal pyramid shape and a light-diffusing effect by the diffusing agent, a content of the diffusing agent may be set to, for example, 0.1 percent by mass or more (preferably, 0.3 percent by mass or more) and 10 percent by mass or less (preferably, 8 percent by mass or less) with a material (matrix) constituting the base material layer 21 being 100 percent by mass. A difference between the refractive index of the diffusing agent and the refractive index of the matrix of the base material layer 21 may be 0.01 or more, preferably 0.03 or more, more preferably 0.05 or more, even more preferably 0.1 or more, and most preferably 0.15 or more. The diffusing effect by the diffusing agent becomes insufficient when the difference between the refractive index of the diffusing agent and the refractive index of the matrix of the base material layer 21 is less than 0.01.

While a resin that constitutes the matrix of the base material layer 21 is not particularly limited as long as a material that transmits light is used, for example, acrylic, polystyrene, polycarbonate, MS (methyl methacrylate-styrene copolymer) resin, polyethylene terephthalate, polyethylene naphthalate, cellulole acetate, or polyimide may be used.

While a thickness of the first light-diffusing sheet 43 is not particularly limited, for example, the thickness may be 3 mm or less (preferably 2 mm or less, more preferably 1.5 mm or less, even more preferably 1 mm or less) and 0.1 mm or more. Achieving a thinner liquid crystal display becomes difficult when the thickness of the first light-diffusing sheet 43 exceeds 3 mm. On the other hand, producing an effect of improving brightness uniformity becomes difficult when the thickness of the first light-diffusing sheet 43 falls below 0.1 mm.

When the first light-diffusing sheet 43 has a multilayer structure (for example, a base material layer constituting a first layer and a depressed portion formation layer constituting a second layer), a thickness of the depressed portion formation layer is greater than a maximum depth of the depressed portions 22. For example, in a case of a layer provided with depressed portions with a depth of 20 μm, the thickness of the layer is set greater than 20 μm. The first light-diffusing sheet 43 may be configured to have a structure of three layers or more including the base material layer and the depressed portion formation layer. Alternatively, the base material layer and the depressed portion formation layer may be respectively configured as independent sheets and the sheets may either be stacked or separately arranged.

<Method of Manufacturing Light-Diffusing Sheet>

Hereinafter, a method of manufacturing the first light-diffusing sheet 43 will be described. While the method of manufacturing the first light-diffusing sheet 43 is not particularly limited, for example, an extrusion molding method or an injection molding method may be used. When subjecting the first light-diffusing sheet 43 to extrusion molding, for example, a line rate may be set to 10 m/minute or more and 30 m/minute or less and compressible linear pressure may be set to 100 kgf/cm or more and 500 kgf/cm or less.

Procedures of manufacturing a single-layer light-diffusing sheet with uneven shapes on a surface thereof using an extrusion molding method are as follows. First, plastic particles with a pellet shape to which a diffusing agent has been added (plastic particles with a pellet shape to which a diffusing agent has not been added may be mixed therewith) are fed into a single-screw extruder and melted and kneaded while applying heat. Subsequently, after sandwiching molten resin extruded by T-dies with two metal rolls and cooling the molten resin, a diffusing sheet is fabricated by conveying the resin using a guide roll and cutting the resin into flat sheets with a sheet cutter. In this case, since sandwiching the molten resin using metal rolls of which surfaces have an inverted shape of a desired uneven shape causes the inverted shape on the roll surfaces to be transferred to the resin, the desired uneven shape can be formed on the surface of the diffusing sheet. In addition, since the shape transferred to the resin does not necessarily represent a 100% transfer of the shape of the roll surfaces, the shape of the roll surfaces may be designed backward from a degree of transfer.

When manufacturing a light-diffusing sheet with a two-layer structure having an uneven shape on a surface thereof using an extrusion molding method, for example, after feeding plastic particles with a pellet shape necessary for forming each layer into each of two single-screw extruders, procedures similar to those described earlier may be executed for each layer and the respective fabricated sheets may be stacked.

Alternatively, a light-diffusing sheet with a two-layer structure having an uneven shape on a surface thereof may be fabricated as described below. First, plastic particles with a pellet shape necessary for forming each layer are fed into each of two single-screw extruders and melted and kneaded while applying heat. Subsequently, molten resin to become each layer is fed into one T-die and stacked molten resin having been stacked in the T-die and extruded from the T-die is sandwiched between two metal rolls and cooled. Subsequently, a diffusing sheet with a two-layer structure having an uneven shape on a surface thereof may be fabricated by conveying the stacked molten resin using a guide roll and cutting the resin into flat sheets with a sheet cutter.

In addition, a light-diffusing sheet may be manufactured as described below by shape-transfer using UV (ultraviolet light). First, a roll having an inverted shape of an uneven shape to be transferred is filled with an uncured ultraviolet-curing resin and a base material is pressed against the resin. Next, ultraviolet light is radiated to cure the ultraviolet-curing resin in a state where the roll filled with the resin and the base material are integrated. Next, a sheet to which the uneven shape has been shape-transferred by the resin is separated from the roll. Finally, the sheet is once again irradiated with ultraviolet light to completely cure the resin and a diffusing sheet with an uneven shape on a surface thereof is fabricated.

<Features of Light-Diffusing Sheet>

Hereinafter, features of the first light-diffusing sheet 43 according to the present embodiment will be described in detail with reference to FIGS. 5 to 10.

As shown in FIG. 5, the plurality of depressed portions 22 formed in, for example, an approximately inverted right square pyramid are provided on the first surface 43*a* of the first light-diffusing sheet 43. A center 22*a* of each depressed portion 22 is the deepest part of the depressed portion 22. The plurality of depressed portions 22 are arrayed in an X-direction (first direction) and a Y-direction (second direction) that are orthogonal to each other. Depressed portions 22 that are adjacent to each other are partitioned by ridgelines 23. The ridgelines 23 extend in the X-direction and the Y-direction.

As a feature of the first light-diffusing sheet 43, with respect to straight lines Lx and Ly connecting intersections 23*a* of the ridgelines 23, the ridgelines 23 have a depressed shape between the intersections 23*a*. In this case, a maximum height difference d between the straight lines Lx and Ly that connect the intersections 23*a* and the ridgelines 23 shall be 1 μm or more and 10 μm or less, may preferably be 1.5 μm or more and 7 μm or less, and may more preferably be 2.5 μm or more and 5 μm or less.

While the ridgelines preferably have a depressed shape between all intersections 23*a* of the ridgelines in the first light-diffusing sheet 43, it is not essential for the ridgelines 23 to have a depressed shape between all of the intersections 23*a*. In other words, the ridgelines 23 need not have a depressed shape between parts of the intersections 23*a*.

Figure 6:
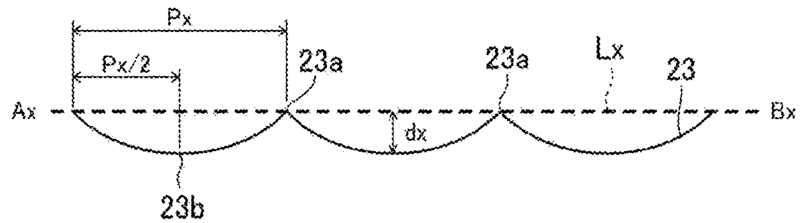
FIG. 6 is a schematic view showing an example of a shape of an X-direction ridgeline which partitions depressed portions in the light-diffusing sheet according to the embodiment.
Figure 7:
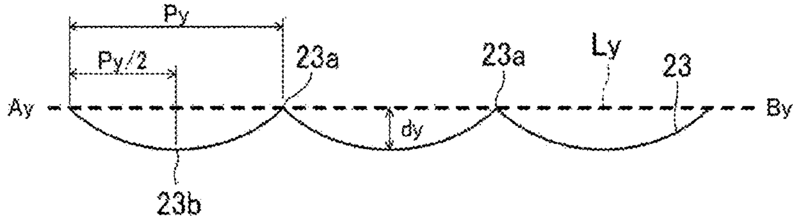
FIG. 7 is a schematic view showing an example of a shape of a Y-direction ridgeline which partitions depressed portions in the light-diffusing sheet according to the embodiment.

FIG. 6 shows an example of a shape of the ridgeline 23 extending in the X-direction along a line Ax-Bx shown in FIG. 5 as viewed from a direction parallel to the sheet surface and perpendicular to the X-direction, and FIG. 7 shows an example of a shape of the ridgeline 23 extending in the Y-direction along a line Ay-By shown in FIG. 5 as viewed from a direction parallel to the sheet surface and perpendicular to the Y-direction. As shown in FIG. 6, with respect to the straight line Lx that connects the intersections 23*a* of the ridgelines 23 in the X-direction, the ridgelines 23 have a depressed shape between the intersections 23*a*. When an array pitch in the X-direction of the depressed portions 22 is denoted by Px, for example, the ridgelines 23 extending in the X-direction have a lowest point 23*b* at a position of Px/2 (half a pitch) from the intersections 23*a* and a distance (maximum height difference) from the straight line Lx to the lowest point 23*b* is dx. In addition, as shown in FIG. 7, with respect to the straight line Ly that connects the intersections 23*a* of the ridgelines 23 in the Y-direction, the ridgelines 23 have a depressed shape between the intersections 23*a*. When an array pitch in the Y-direction of the depressed portions 22 is denoted by Py, for example, the ridgelines 23 extending in the Y-direction have the lowest point 23*b* at a position of Py/2 (half a pitch) from the intersections 23*a* and a distance (maximum height difference) from the straight line Ly to the lowest point 23*b* is dy.

When the depressed portions 22 are formed in an inverted right square pyramid, the array pitch Px of the depressed portions 22 in the X-direction is equal to intervals (horizontal distances) between the intersections 23*a* in the X-direction and the array pitch Py of the depressed portions 22 in the Y-direction is equal to intervals (horizontal distances) between the intersections 23*a* in the Y-direction.

In addition, when a maximum height difference d represents an average value of the maximum height difference dx in the X-direction and the maximum height difference dy in the Y-direction, the maximum height difference d shall be set to 1 μm or more and 10 μm or less, may preferably be set to 1.5 μm or more and 7 μm or less, and may more preferably be set to 2.5 μm or more and 5 μm or less.

Figure 8:
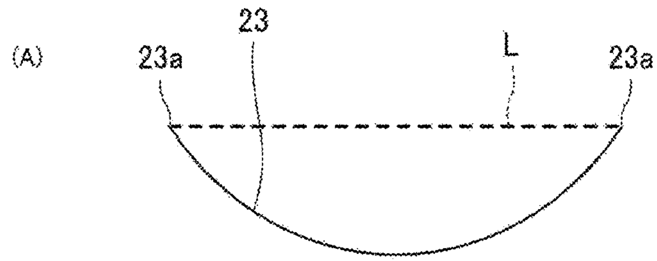
FIG. 8 is a schematic view showing variations of the shape of ridgelines which partition depressed portions in the light-diffusing sheet according to the embodiment.
Figure 8:
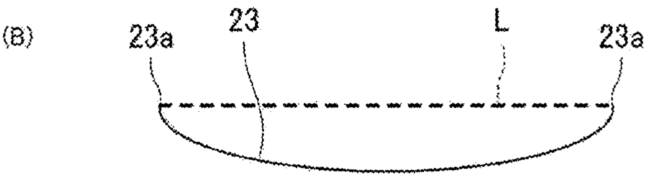
Figure 8:
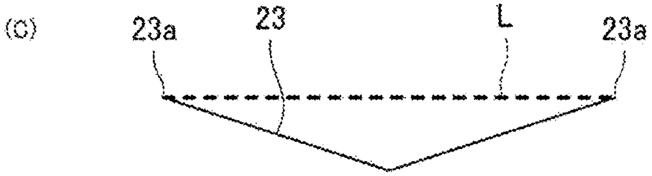
Figure 8:
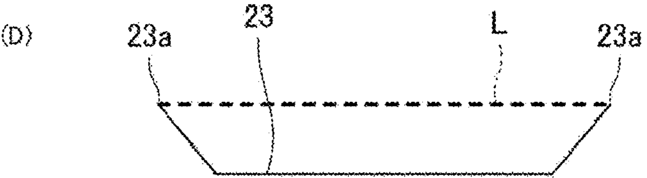

Furthermore, while a depressed shape of the ridgelines 23 between the intersections 23*a* is not particularly limited, for example, as shown in FIG. 8, the ridgelines 23 may be depressed in an approximately arc shape ((A) in FIG. 8), an approximately parabolic shape ((B) in FIG. 8), an approximately triangular shape ((C) in FIG. 8), or an approximately trapezoidal shape ((D) in FIG. 8) with respect to the straight line L that connects the intersections 23*a*.

As another feature of the first light-diffusing sheet 43, when the array pitch of the depressed portions 22 is denoted by P and a dimension occupied by a curved portion of a vertex of each of the ridgelines 23 in the array direction of the depressed portions 22 is denoted by Wr, a ratio Wr/P shall be 0.3 or lower, may more preferably be 0.2 or lower, and may even more preferably be 0.1 or lower.

Figure 9:
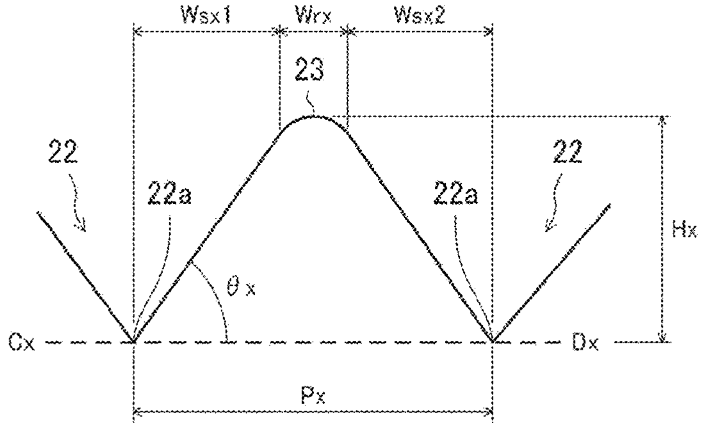
FIG. 9 is a schematic view showing an example of a sectional structure in a case where the light-diffusing sheet according to the embodiment is cut along a plane which passes through respective centers of depressed portions adjacent to each other in the X-direction and an intermediate point of a ridgeline positioned between the depressed portions and which is perpendicular to a sheet surface.
Figure 10:
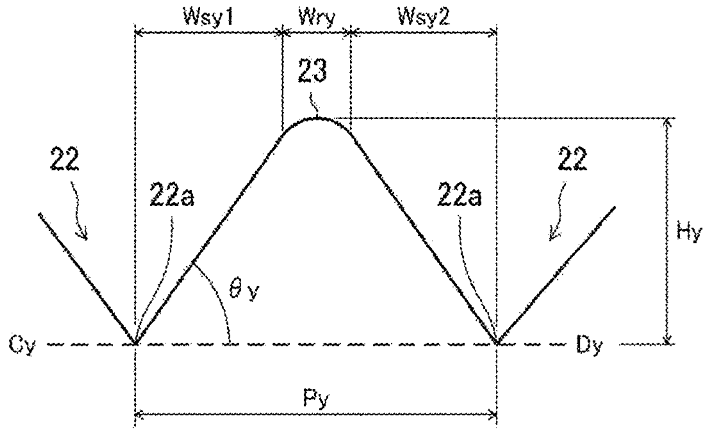
FIG. 10 is a schematic view showing an example of a sectional structure in a case where the light-diffusing sheet according to the embodiment is cut along a plane which passes through respective centers of depressed portions adjacent to each other in the Y-direction and an intermediate point of a ridgeline positioned between the depressed portions and which is perpendicular to a sheet surface.

FIG. 9 shows an example of a sectional structure of the first light-diffusing sheet 43 along a line Cx-Dx in FIG. 5 and FIG. 10 shows an example of a sectional structure of the first light-diffusing sheet 43 along a line Cy-Dy in FIG. 5. Specifically, FIG. 9 shows a sectional structure in a case where the first light-diffusing sheet 43 is cut along a plane which passes through respective centers 22*a* of the depressed portions 22 adjacent to each other in the X-direction and an intermediate point between the intersections 23*a* of the ridgelines 23 positioned between the depressed portions 22 and which is perpendicular to the sheet surface. FIG. 10 shows a sectional structure in a case where the first light-diffusing sheet 43 is cut along a plane which passes through respective centers 22*a* of the depressed portions 22 adjacent to each other in the Y-direction and an intermediate point between the intersections 23*a* of the ridgelines 23 positioned between the depressed portions 22 and which is perpendicular to the sheet surface.

In the sectional structure shown in FIG. 9, an interval (horizontal distance) between respective centers 22*a* of the depressed portions 22 adjacent to each other in the X-direction is equal to the array pitch Px of the depressed portions 22 in the X-direction. A dimension occupied by the curved portion of the vertex of the ridgelines 23 in the X-direction is denoted by Wrx. Dimensions occupied in the X-direction by straight portions of respective wall surfaces of the depressed portions 22 (inclined surfaces of inverted square pyramids) adjacent to each other across the ridgelines 23 are denoted by Wsx1 and Wsx2. An angle formed between the wall surface of the depressed portions 22 (inclined surfaces of inverted square pyramids) in the X-direction and the sheet surface is denoted by Θx. A height from the center 22*a* of each depressed portion 22 to the vertex (an intermediate point between the intersections 23*a*) of each ridgeline 23 (ridgeline 23 extending in the Y-direction) is denoted by Hx.

In the sectional structure shown in FIG. 10, an interval (horizontal distance) between respective centers 22*a* of the depressed portions 22 adjacent to each other in the Y-direction is equal to the array pitch Py of the depressed portions 22 in the Y-direction. A dimension occupied by the curved portion of the vertex of the ridgelines 23 in the Y-direction is denoted by Wry. Dimensions occupied in the Y-direction by straight portions of respective wall surfaces of the depressed portions 22 (inclined surfaces of inverted square pyramids) adjacent to each other across the ridgelines 23 are denoted by Wsy1 and Wsy2. An angle formed between the wall surface of the depressed portions 22 (inclined surfaces of inverted square pyramids) in the Y-direction and the sheet surface is denoted by Θy. A height from the center 22*a* of each depressed portion 22 to the vertex (an intermediate point between the intersections 23*a*) of each ridgeline 23 (ridgeline 23 extending in the X-direction) is denoted by Hy.

When the depressed portions 22 are formed in an inverted square pyramid, and an average value of the array pitch Px and the array pitch Py is denoted by P and an average value of the dimension Wrx and the dimension Wry is denoted by Wr, a ratio Wr/P shall be set to 0.3 or lower, may preferably be set to 0.2 or lower, and may more preferably be set to 0.1 or lower.

Figure 11:
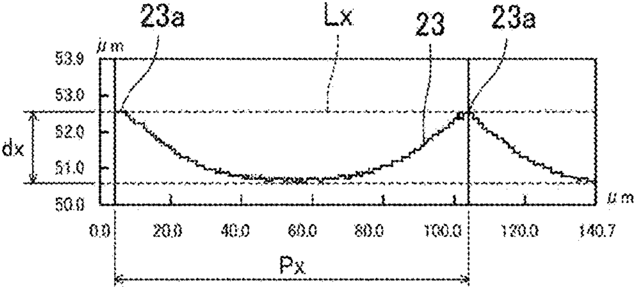
FIG. 11 is a diagram showing an example of a result of a measurement of a shape and dimensions of the X-direction ridgeline shown in FIG. 6 by a laser microscope.
Figure 12:
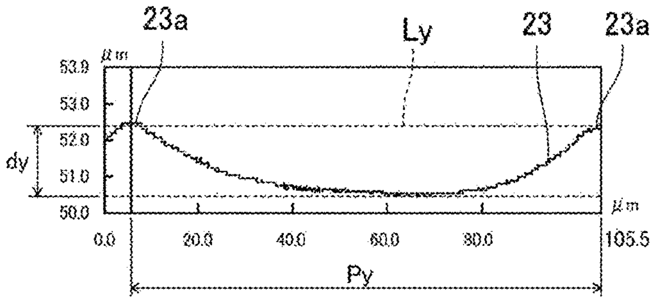
FIG. 12 is a diagram showing an example of a result of a measurement of a shape and dimensions of the Y-direction ridgeline shown in FIG. 7 by a laser microscope.
Figure 13:
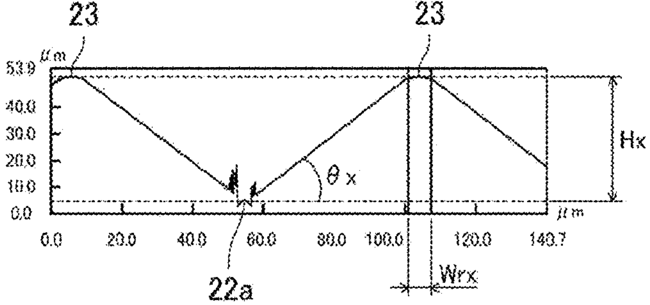
FIG. 13 is a diagram showing an example of a result of a measurement of a shape, dimensions, and the like of the sectional structure shown in FIG. 9 by a laser microscope.
Figure 14:
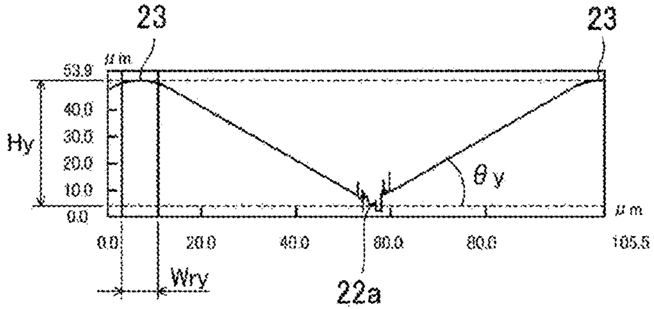
FIG. 14 is a diagram showing an example of a result of a measurement of a shape, dimensions, and the like of the sectional structure shown in FIG. 10 by a laser microscope.

FIG. 11 shows an example of a result of a measurement by a laser microscope of a shape and a dimension of the X-direction ridgeline shown in FIG. 6, FIG. 12 shows an example of a result of a measurement by a laser microscope of a shape and a dimension of the Y-direction ridgeline shown in FIG. 7, FIG. 13 shows an example of a result of a measurement by a laser microscope of a shape, a dimension, and an angle of the sectional structure shown in FIG. 9, and FIG. 14 shows an example of a result of a measurement by a laser microscope of a shape, a dimension, and an angle of the sectional structure shown in FIG. 10.

In FIGS. 11 and 12, in a measurement of maximum values (maximum height differences) dx and dy of distances between the straight lines Lx and Ly connecting the intersections 23*a* of the ridgelines 23 and the ridgelines 23, maximum values of lengths of perpendiculars drawn at a right angle from a point on the ridgelines 23 to the straight lines Lx and Ly are denoted by dx and dy.

In addition, in a measurement of the array pitches Px and Py, a "horizontal distance between the intersections 23*a*" in each of the X-direction and the Y-direction is obtained as Px and Py. In this manner, the array pitches Px and Py can be readily and accurately obtained even in the method of measuring a "horizontal distance between the intersections 23*a*".

Figure 15:
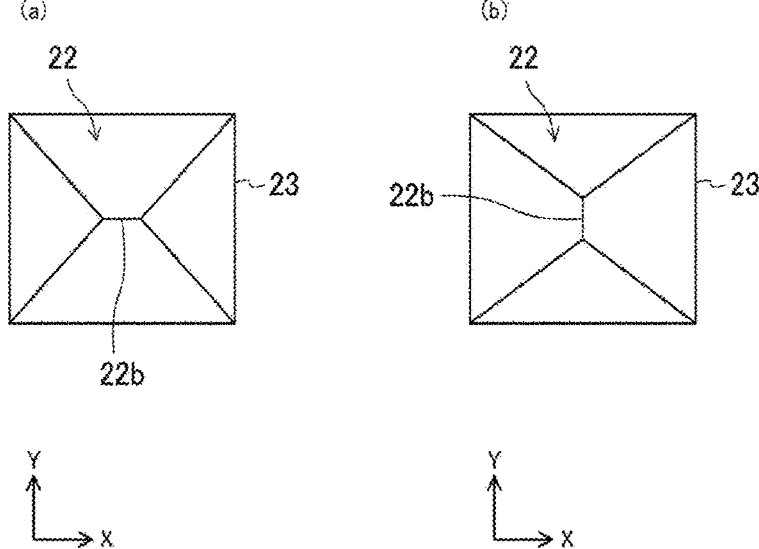
FIG. 15 is a schematic view showing a shape of a vertex of each of the depressed portions (inverted square pyramids) formed on the light-diffusing sheet according to the embodiment.

A further feature of the first light-diffusing sheet 43 is that, for example, as shown in FIG. 15, the plurality of depressed portions 22 include the depressed portion 22 of which a vertex 22*b* of an approximately inverted polygonal pyramid (in the present example, an approximately inverted square pyramid) is formed in a linear shape. In other words, the plurality of depressed portions 22 include the depressed portion 22 of which the vertex 22*b* of the approximately inverted square pyramid is formed in a dot shape and the depressed portion 22 of which the vertex 22*b* of the approximately inverted square pyramid is formed in a linear shape.

When the vertex 22*b* of the approximately inverted square pyramid is formed in a dot shape in the depressed portions 22, the vertex 22*b* becomes the center 22*a* of the depressed portions 22. In the first light-diffusing sheet 43, the vertex 22*b* of all of the depressed portions 22 may be formed in a linear shape. Note that in FIG. 15, the vertex 22*b* with a linear shape is shown enlarged than reality. In addition, (a) in FIG. 15 shows the vertex 22*b* extending in a linear shape in the X-direction and (b) in FIG. 15 shows the vertex 22*b* extending in a linear shape in the Y-direction.

Advantageous Effects of Embodiment

As described above, the first light-diffusing sheet 43 according to the present embodiment includes the plurality of depressed portions 22 formed in an approximately inverted polygonal pyramid on at least the first surface 43*a*. The ridgelines 23 that partition the plurality of depressed portions 22 have a depressed shape between intersections 23*a* of the ridgelines 23 with respect to a straight line that connects the intersections 23*a*. When the array pitch of the plurality of depressed portions 22 is denoted by P and the dimension occupied by a curved portion of a vertex of each of the ridgelines 23 in the array direction of the plurality of depressed portions 22 is denoted by Wr, the ratio Wr/P is 0.3 or lower. The maximum height difference d between connecting the intersections 23*a* of the ridgelines 23 and the ridgelines 23 is 1 μm or more and 10 μm or less. The plurality of depressed portions 22 includes the depressed portion 22 which is formed in an approximately inverted polygonal pyramid and which has the vertex 22*b* with a linear shape.

With the first light-diffusing sheet 43 according to the present embodiment, since the first light-diffusing sheet 43 includes the plurality of depressed portions 22 formed in an approximately inverted polygonal pyramid on at least the first surface 43*a*, brightness uniformity can be improved. In addition, while the ridgelines 23 (an opening edge of the depressed portions 22) that partition the depressed portions 22 cause abrasion and damage, the ridgelines 23 have a depressed shape between the intersections 23*a* of the ridgelines 23. Therefore, abrasion and damage are less likely to occur even when the light-diffusing sheet is used by being stacked with other optical sheets or other light-diffusing sheets. In addition, the dimension Wr occupied by the curved portion of a vertex of each of the ridgelines 23 in the array direction of the depressed portions 22 is kept to or under 30% of the array pitch P of the depressed portions. Therefore, since the vertex of the ridgelines 23 can maintain a steep shape, brightness uniformity does not readily decline even when the ridgelines 23 are depressed between the intersections 23*a*. Furthermore, since the maximum height difference d between a straight line connecting the intersections 23*a* and the ridgelines 23 is set to 1 μm or more, scratch resistance is improved and, at the same time, since the maximum height difference d is set to 10 μm or less, a decline in brightness uniformity can be suppressed. Moreover, since the vertex 22*b* of the depressed portions 22 (approximately inverted polygonal pyramids) is formed in a linear shape, mass production of the first light-diffusing sheet 43 of which brightness uniformity is prevented from declining can be readily performed.

In the first light-diffusing sheet 43 according to the present embodiment, when the maximum height difference d between a straight line that connects the intersections 23*a* and the ridgelines 23 is 1.5 μm or more and 7 μm or less, both scratch resistance and brightness uniformity can be further improved. In this case, when the maximum height difference d is 2.5 μm or more and 5 μm or less, both scratch resistance and brightness uniformity can be even further improved.

In the first light-diffusing sheet 43 according to the present embodiment, in a case where the array pitch of the plurality of depressed portions 22 is denoted by P and a dimension occupied by a curved portion of a vertex of each of the ridgelines 23 in the array direction of the plurality of depressed portions 22 is denoted by Wr, when the ratio Wr/P is 0.2 or lower, brightness uniformity can be further improved. In this case, when the ratio Wr/P is 0.1 or lower, brightness uniformity can be even further improved.

In the first light-diffusing sheet 43 according to the present embodiment, when the array pitch P of the plurality of depressed portions 22 is 50 μm or more and 500 μm or less and an angle formed between the wall surface of the plurality of depressed portions 22 (in other words, inclined surfaces of the approximately inverted polygonal pyramids) and the sheet surface is 40 degrees or more and 65 degrees or less, brightness uniformity can be improved.

In the first light-diffusing sheet 43 according to the present embodiment, when the ridgeline 23 is depressed in an approximately parabolic shape, an approximately arc shape, an approximately triangular shape, or an approximately trapezoidal shape between the intersections 23*a*, scratch resistance can be improved.

In the first light-diffusing sheet 43 according to the present embodiment, the plurality of depressed portions 22 may be formed in an approximately inverted square pyramid. In this case, the ridgelines 23 may extend in the X-direction (first direction) and the Y-direction (second direction). In addition, the maximum height difference d between a straight line that connects the intersections 23*a* and the ridgelines 23 may be an average value of the maximum height difference dx between the straight line and the ridgelines 23 in the X-direction and a maximum height difference dy between the straight line and the ridgelines 23 in the Y-direction. Furthermore, the array pitch P of the plurality of depressed portions 22 may be an average value of the array pitch Px of the depressed portions 22 in the X-direction and an array pitch Py of the depressed portions 22 in the Y-direction. Moreover, the dimension Wr occupied by a curved portion of a vertex of each of the ridgelines 23 in the array direction of the depressed portions 22 may be an average value of the dimension Wrx occupied by a curved portion of a vertex of each of the ridgelines 23 in the X-direction and the dimension Wry occupied by a curved portion of a vertex of each of the ridgelines 23 in the Y-direction. Accordingly, a light-diffusing sheet with superior scratch resistance and brightness uniformity can be readily manufactured.

In the first light-diffusing sheet 43 according to the present embodiment, when the plurality of depressed portions 22 are only provided on the first surface 43 a and the second surface 43*b* is a matte surface, brightness uniformity can be further improved while suppressing abrasion and damage on the second surface 43*b*.

In the first light-diffusing sheet 43 according to the present embodiment, a ratio of depressed portions 22 of which the vertex 22*b* is formed in a linear shape among the plurality of depressed portions 22 may be 10% or more. Alternatively, the ratio may be 20% or more, 30% or more, 40% or more, 50% or more, 60% or more, 70% or more, 80% or more, 90% or more, or 100%.

The backlight unit 40 according to the present embodiment is the backlight unit 40 which is built into the liquid crystal display device 50 and which guides light emitted by the light source 42 toward the display screen 50*a* and includes the first light-diffusing sheet 43 according to the present embodiment between the display screen 50*a* and the light source 42.

Since the backlight unit 40 according to the present embodiment includes the first light-diffusing sheet 43 according to the present embodiment, brightness uniformity can be improved and, at the same time, damage can be suppressed even when sheets of the first light-diffusing sheet 43 are stacked or the first light-diffusing sheet 43 and other optical sheets are stacked.

In the backlight unit 40 according to the present embodiment, when the light source 42 is arranged on the reflecting sheet 41 provided on an opposite side to the display screen 50*a* as viewed from the first light-diffusing sheet 43, brightness uniformity is further improved.

The liquid crystal display device 50 according to the present embodiment includes the backlight unit 40 according to the present embodiment and the liquid crystal display panel 5.

Since the liquid crystal display device 50 according to the present embodiment and an information apparatus including the liquid crystal display device 50 include the backlight unit 40 according to the present embodiment, brightness uniformity can be improved and, at the same time, damage can be suppressed even when sheets of the first light-diffusing sheet 43 are stacked or the first light-diffusing sheet 43 and other optical sheets are stacked.

The method of manufacturing a light-diffusing sheet according to the present embodiment is a method of manufacturing the first light-diffusing sheet 43 according to the present embodiment, wherein the first light-diffusing sheet 43 is subjected to extrusion molding at a line rate of 10 m/minute or more and 30 m/minute or less and compressible linear pressure of 100 kgf/cm or more and 500 kgf/cm or less.

With the method of manufacturing a light-diffusing sheet according to the present embodiment, since the dimension Wr occupied by the curved portion of the vertex of the ridgelines 23 in the array direction of the depressed portions 22 can be kept to or under 30% of the array pitch P of the depressed portions 22, the first light-diffusing sheet 43 of which a shape of the vertex of the ridgelines 23 is steep and which has superior brightness uniformity can be manufactured.

In addition, with the method of manufacturing a light-diffusing sheet according to the present embodiment, the maximum height difference d between a straight line that connects intersections 23*a* and the ridgelines 23 can be set to 1 μm or more and 10 μm or less. In other words, the first light-diffusing sheet 43 in which the ridgelines 23 are depressed between the intersections 23*a* and elevated at portions of the intersections 23*a* is obtained. Therefore, even when sheets of the first light-diffusing sheet 43 are stacked or the first light-diffusing sheet 43 and other optical sheets are stacked, since the ridgelines 23 are less likely to come into contact with the other optical sheets between the intersections 23*a*, abrasion and damage are less likely to occur, and since the ridgelines 23 come into point contact with, for example, the other optical sheets at the intersections 23*a*, slippage is created and reduces abrasion and damage. As a result, the first light-diffusing sheet 43 with superior scratch resistance can be manufactured.

Furthermore, with the method of manufacturing a light-diffusing sheet according to the present embodiment, since extrusion molding is used, the first light-diffusing sheet 43 according to the present embodiment can be manufactured at low cost.

While the vertex 22*b* of the depressed portions 22 (approximately inverted polygonal pyramids) is formed in a linear shape in the first light-diffusing sheet 43 according to the present embodiment, even when a planar shape of the vertex 22*b* is formed in a rectangular shape instead of a linear shape, similar advantageous effects to the present embodiment can be produced.

Examples

Hereinafter, the first light-diffusing sheet 43 according to examples will be described by comparing the examples with comparative examples.

<Measurement of Shape, Dimensions, and Angle of Depressed Portions>

A shape observation of the depressed portions 22 formed on the first light-diffusing sheet 43 according to each example described below was performed using the laser microscope VK-100 manufactured by KEYENCE CORPORATION. Specifically, performed were measurements of: a cross-sectional shape of the ridgelines 23 of the depressed portions 22 formed in an inverted right square pyramid (cross-sectional shapes shown in FIGS. 6, 7, 9, and 10); the maximum height differences dx and dy (maximum values of distances between a straight line that connects the intersections 23*a* and the ridgelines 23) shown in FIGS. 6 and 7 and an average value d thereof; the heights Hx and Hy (heights from the center 22*a* of the depressed portions 22 to the ridgelines 23) shown in FIGS. 9 and 10 and an average value H thereof; the dimensions Wrx and Wry (dimensions occupied by a curved portion of a vertex of each of the ridgelines 23 in the X-direction and the Y-direction) shown in FIGS. 9 and 10 and an average value Wr thereof; array pitches Px and Py (horizontal distances between the intersections 23*a* in the X-direction and the Y-direction) of the depressed portions 22 shown in FIGS. 6 and 7 and an average value P thereof; the ratio Wr/P (unit: %) of the dimension Wr to the array pitch P; and the angles θx and θy (angles formed between the wall surface of the depressed portions 22 (the inclined surface of the inverted right square pyramids) and the sheet surface of the first light-diffusing sheet 43 in the X-direction and the Y-direction) shown in FIGS. 9 and 10.

<Measurement of Optical Properties>

As optical properties of the first light-diffusing sheet 43 according to each example described below, a Haze and light transmittance at a wavelength of 450 nm were measured. Haze was measured using HZ-2 manufactured by Suga Test Instruments Co., Ltd. in conformity with JIS K-7105 by causing light to be incident to the surface (first surface 43*a*) with the depressed portions 22 formed in an inverted right square pyramid. In addition, light transmittance at the wavelength of 450 nm was measured using V-670 manufactured by JASCO Corporation by causing light to be incident to the surface (first surface 43*a*) with the depressed portions 22 formed in an inverted right square pyramid.

<Assessment of Scratch Resistance>

Figure 16:
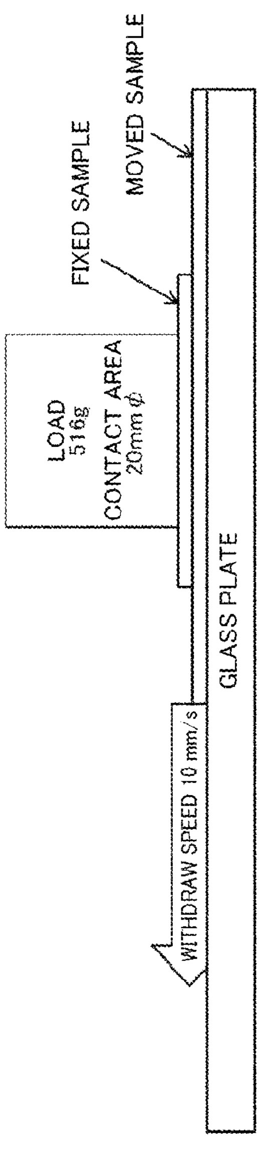
FIG. 16 is a configuration diagram of a device for measuring scratch resistance of a light-diffusing sheet in examples.

A device shown in FIG. 16 was used for a scratch resistance test of the first light-diffusing sheet 43 of each example to be described later. As shown in FIG. 16, a moved sample and a fixed sample were sequentially stacked on a glass plate by using a lower surface of the first light-diffusing sheet 43 to be the fixed sample as the first surface 43*a* (the surface on which the depressed portions 22 with an inverted right square pyramid shape are formed) and using an upper surface of the first light-diffusing sheet 43 to be the moved sample as the second surface 43*b* (matte surface), a weight with a load of 516 gf was placed on an area of a circular shape with a diameter of 20 mm from above, the moved sample was moved 100 mm by being withdrawn at a withdraw speed of 10 mm/second, and a degree of scratching of frictional surfaces of the moved sample and the fixed sample was visually inspected and determined. The inspection and the determination were performed on both the lower surface (the formation surface of the depressed portions 22 that are inverted right square pyramids) of the fixed sample and the upper surface (matte surface) of the moved sample.

Assessments in the inspection and the determination were performed based on the following criteria.

AA: Light-diffusing sheet with exceptionally high scratch resistance with absolutely no visible scratches.

A: Light-diffusing sheet with high scratch resistance with hardly any visible scratches.

B: Light-diffusing sheet with somewhat high scratch resistance with a minimal amount of visible scratches.

C: Light-diffusing sheet of which scratch resistance is near an acceptable lower limit with some visible scratches.

X: Light-diffusing sheet with poor scratch resistance with a large amount of visible scratches.

<Measurement of Brightness and Brightness Uniformity>

A measurement of brightness and brightness uniformity of the first light-diffusing sheet 43 according to each example described below was performed with the configuration of the backlight unit 40 shown in FIGS. 2 and 3. In other words, two sheets of the first light-diffusing sheet 43 with the depressed portions 22 in an inverted right square pyramid shape obtained in the examples to be described below were stacked and arranged on the small light sources 42 (LED array) arranged in an array so that the first surface 43*a* on which the depressed portion 22 are formed faces the side of the light sources 42. One sheet of the second light-diffusing sheet 44 with a thickness of 120 μm in which a same diffusing agent was used blended with a same aromatic polycarbonate resin in a same composition as in example 18 to be described later was stacked and arranged on the stack of the first light-diffusing sheet 43 so that the second surface 44*b* being a mirror surface faces the side of the light sources 42. In manufacturing the second light-diffusing sheet 44, the second light-diffusing sheet 44 was created by a same method as example 1 to be described later using a mirror surface roll as one roll and a roll having a same random matte shape (surface roughness Ra=2.5 μm) as example 1 on a surface thereof as another roll. In the second light-diffusing sheet 44, surface roughness Ra on the side of the matte surface (first surface 44*a*) was 1.6 μm and surface roughness Ra on the side of the mirror surface (second surface 44*b*) was 0.4 μm. Two prism sheets 45 and 46 were stacked and arranged on the second light-diffusing sheet 44. A measurement of brightness and brightness uniformity was performed with the configuration described above. An array with an LED pitch of 3 mm was used as the LED array and blue LEDs (part number XPGDRY-L1-0000-00501) manufactured by CreeLED, Inc. were used as the LEDs (small light sources 42).

In the measurement of brightness uniformity, firstly, in the LED array (6×6) shown in FIG. 3, cross-sectional brightness was acquired along a diagonal L passing directly above the LEDs (small light sources 42), secondly, an average value and a standard deviation of the cross-sectional brightness were calculated and, thirdly, brightness uniformity was obtained according to a calculation formula expressed as brightness uniformity=(average value of cross-sectional brightness)/(standard deviation of cross-sectional brightness).

The brightness uniformity obtained in this manner show that, the higher a numerical value of the brightness uniformity, the more uniform the brightness.

Assessment criteria of brightness uniformity are as follows.

AA: Light-diffusing sheet with brightness uniformity of 210 or higher and exhibiting highest uniformity at a level where there is absolutely no visible brightness non-uniformities.

A: Light-diffusing sheet with brightness uniformity of 200 or higher and lower than 210 and exhibiting high uniformity at a level where brightness spots are hardly visible.

B: Light-diffusing sheet with brightness uniformity of 190 or higher and lower than 200 and exhibiting an acceptable level of uniformity with a minimal amount of visible brightness spots.

C: Light-diffusing sheet with brightness uniformity of 180 or higher and lower than 190 and exhibiting the lowest acceptable level of uniformity with visible brightness spots.

X: Light-diffusing sheet with brightness uniformity of lower than 180 and exhibiting poor uniformity with clearly visible brightness spots.

In addition, assessment criteria of brightness are as follows.

A: Light-diffusing sheet with average value of cross-sectional brightness of 3150 cd/m$^2$ or higher.

B: Light-diffusing sheet with average value of cross-sectional brightness of 3100 cd/m$^2$ or higher and lower than 3150 cd/m$^2$.

C: Light-diffusing sheet with average value of cross-sectional brightness of 3050 cd/m$^2$ or higher and lower than 3100 cd/m$^2$.

<Overall Assessment>

An overall assessment of the first light-diffusing sheet 43 according to each example to be described later was performed according to the following criteria based on a result of the scratch resistance test and an assessment result of brightness uniformity.

AA: Best overall light-diffusing sheet which scored A or higher in all of the assessment results of the scratch resistance test of both the inverted right square pyramid surface and the matte surface and the assessment result of brightness uniformity and which scored two or more AA's.

A: Best overall light-diffusing sheet (excluding AA-assessed items) which scored A or higher in all of the assessment results of the scratch resistance test of both the inverted right square pyramid surface and the matte surface and the assessment result of brightness uniformity.

B: High overall light-diffusing sheet (excluding AA-assessed and A-assessed items) which scored B or higher in all of the assessment results of the scratch resistance test of both the inverted right square pyramid surface and the matte surface and the assessment result of brightness uniformity.

C: Usable light-diffusing sheet (excluding AA-assessed, A-assessed, and B-assessed items) with lowest overall acceptable level of performance which scored C or higher in all of the assessment results of the scratch resistance test of both the inverted right square pyramid surface and the matte surface and the assessment result of brightness uniformity.

X: Poor overall light-diffusing sheet with an assessment of X in any one of the assessment results of the scratch resistance test of both the inverted right square pyramid surface and the matte surface and the assessment result of brightness uniformity.

Example 1

A method of manufacturing the first light-diffusing sheet 43 according to example 1 is as follows. First, an aromatic polycarbonate resin of which a melt mass-flow rate as measured in conformity with ISO 1133 is 15 g/10 minutes is fed into an extruder, melted and kneaded, and extruded by a T-die. Subsequently, using a roll having, on a surface thereof, a shape (a shape of a right square pyramid with a height of 50 μm, a pitch of 100 μm, and a vertex angle of 90 degrees) shown in (A) and (B) ((B) is a shape diagram representing a view from a direction of a cross section taken along line X-Y in (A)) in FIG. 17 as one of two metal rolls and using a roll having, on a surface thereof, a random matte shape (surface roughness Ra=2.5 μm) as the other roll, the molten resin extruded by the T-die is sandwiched between the two rolls and cooled while performing shape transfer. Accordingly, as shown in Table 1, a 180 μm-thick, single-layer light-diffusing sheet having depressed (inverted) pyramid shapes with a depth dependent on a height of the right square pyramids on the roll provided on one surface and a matte surface with surface roughness Ra=1.67 μm provided on the other surface was created by the extrusion molding method. As shown in Table 1, the light-diffusing sheet was obtained under molding conditions including applying pressure until a line rate was set to 17 m/minute, a compressive force (compressible linear pressure) between the two rolls was set to 280 kgf/cm and under resin temperature conditions (230 to 310° C.) that enable favorable shape transfer to the polycarbonate resin and favorable sheet separation from the rolls.

formed in an inverted right square pyramid (cross-sectional shapes shown in FIGS. 6, 7, 9, and 10); the maximum height differences dx and dy (maximum values of distances between a straight line that connects the intersections 23*a* and the ridgelines 23) shown in FIGS. 6 and 7 and an average value d thereof; the heights Hx and Hy (heights from the center 22*a* of the depressed portions 22 to the ridgelines 23) shown in FIGS. 9 and 10 and an average value H thereof; the dimensions Wrx and Wry (dimensions occupied by a curved portion of a vertex of each of the ridgelines 23 in the X-direction and the Y-direction) shown in FIGS. 9 and 10 and an average value Wr thereof; array pitches Px and Py (horizontal distances between the intersections 23*a* in the X-direction and the Y-direction) of the depressed portions 22 shown in FIGS. 6 and 7 and an average value P thereof; the ratio Wr/P (unit: %) of the dimension Wr to the array pitch P; and the angles θx and θy (angles formed between the wall surface of the depressed portions 22 (the inclined surface of the inverted right square pyramids) and the sheet surface of the first light-diffusing sheet 43 in the X-direction and the Y-direction) shown in FIGS. 9 and 10.

Examples 2 and 3

In a method of manufacturing the first light-diffusing sheet 43 according to example 2, as shown in Table 1, the same conditions as example 1 were used with the exception of using a roll having, on a surface thereof, a shape of a right square pyramid with a height of 54.6 μm, a pitch of 100 μm, and a vertex angle of 85 degrees as the roll with a right square pyramid shape among the two metal rolls.

In a method of manufacturing the first light-diffusing sheet 43 according to example 3, as shown in Table 1, the same conditions as example 1 were used with the exception of using a roll having, on a surface thereof, a shape of a right square pyramid with a height of 59.6 μm, a pitch of 100 μm, and a vertex angle of 80 degrees as the roll with a right square pyramid shape among the two metal rolls.

Comparative Examples 1 to 3

In comparative example 1, first, a press original plate with a thickness of 1 mm was created using the same aromatic

TABLE 1

| | Raw materials | | Molding method/conditions | | | | | | |
|---|---|---|---|---|---|---|---|---|---|
| | Resin composition | Content of diffusing agent | Molding method | Line rate m/minute | Compressible linear pressure kgf/cm | Film thickness μm | Surface roughness Ra of matte surface μm | Target pitch of inverted square pyramid μm | Target vertex angle of inverted square pyramid Degrees |
| Example 1 | 100 | 0 | Extrusion molding | 17 | 280 | 180 | 1.67 | 100 | 90 |
| Example 2 | 100 | 0 | Extrusion molding | 17 | 280 | 180 | 1.69 | 100 | 85 |
| Example 3 | 100 | 0 | Extrusion molding | 17 | 280 | 180 | 1.71 | 100 | 80 |
| Comparative example 1 | 100 | 0 | Compression molding | — | — | 180 | 1.67 | 100 | 90 |
| Comparative example 2 | 100 | 0 | Compression molding | — | — | 180 | 1.65 | 100 | 85 |
| Comparative example 3 | 100 | 0 | Compression molding | — | — | 180 | 1.69 | 100 | 80 |

Figure 18:
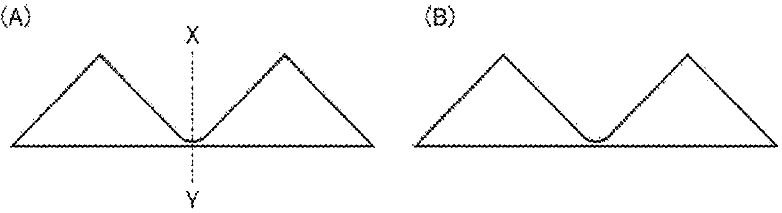
FIG. 18 is a diagram showing a shape of a right square pyramid on a flat plate used to manufacture a light-diffusing sheet in comparative examples.

A shape observation of the depressed portions (inverted right square pyramids) 22 formed on the first light-diffusing sheet 43 according to example 1 fabricated as described above was performed using the laser microscope VK-100 manufactured by KEYENCE CORPORATION. Specifically, performed were measurements of: a cross-sectional shape of the ridgelines 23 of the depressed portions 22 polycarbonate resin as example 1. Next, using a flat metal mold having, on a surface thereof, a shape (a shape created by rounding a valley portion of a pyramid of a same shape of the right square pyramid as example 1 into a curved surface shape with a radius of curvature of 4.2 μm) shown in (A) and (B) ((B) is a shape diagram representing a view from a direction of a cross section taken along line X-Y in (A)) in FIG. 18 and a flat metal mold having, on a surface thereof, the same random matte shape (surface roughness Ra=2.5 μm) as example 1, the press original plate was sandwiched between the two metal molds, placed inside a press machine with a heating and cooling device, and pressed for 20 minutes under conditions including a press plate temperature of 250° C. and surface pressure of 200 kg/cm$^2$. Subsequently, the press plate temperature was cooled to 20° C. while maintaining pressure and the resin plate was held under pressure until sufficiently cooled to create the 180 μm-thick light-diffusing sheet shown in Table 1 by the compression molding method.

In comparative example 2, after creating a press original plate in a similar manner to comparative example 1, the 180 μm-thick light-diffusing sheet shown in Table 1 was created by the compression molding method by performing heating, pressing, and cooling under the same conditions as comparative example 1 with the exception of using a flat metal mold having, on a surface thereof, a shape created by rounding, in a similar manner to comparative example 1, a valley portion of a pyramid of a same shape of the right square pyramid as example 2 into a curved surface shape with a radius of curvature of 4.2 μm.

In comparative example 3, after creating a press original plate in a similar manner to comparative example 1, the 180 μm-thick light-diffusing sheet shown in Table 1 was created by the compression molding method by performing heating, pressing, and cooling under the same conditions as comparative examples 1 and 2 with the exception of using a flat metal mold having, on a surface thereof, a shape created by rounding, in a similar manner to comparative examples 1 and 2, a valley portion of a pyramid of a same shape of the right square pyramid as example 3 into a curved surface shape with a radius of curvature of 4.2 μm.

Assessment of Examples 1 to 3 and Comparative Examples 1 to 3

With respect to the first light-diffusing sheet 43 obtained by examples 1 to 3, a shape, dimensions, an angle, and the like of each element obtained by measurement are shown in Table 2 together with comparative examples 1 to 3, and a measurement result of optical properties, a result of the scratch resistance test, assessment results of brightness and brightness uniformity, and an overall assessment result are shown in Table 3 together with comparative examples 1 to 3.

TABLE 2

| | Shape of inverted right square pyramid | | | | | | | | | | |
|---|---|---|---|---|---|---|---|---|---|---|---|
| | Cross-sectional shape along AxBx and AyBy of ridgelines | Maximum value d of distance between straight line connecting intersections of ridgelines and ridgelines | | | Vertical cross-sectional shape at center of ridgelines | Height H from center point of inverted square pyramid to highest point of center of ridgelines | | | Widths Wrx and Wry of curved portion of cross section at center of ridgelines | | |
| | | dx μm | dy μm | Average value μm | | Hx μm | Hy μm | Average value H of Hx and Hy μm | Wrx μm | Wry μm | Average value Wr of W μm |
| Example 1 | Roughly parabolic shape | 1.8 | 1.8 | 1.8 | Arc | 45.9 | 46.8 | 46.4 | 6.8 | 5.1 | 6.0 |
| Example 2 | Roughly parabolic shape | 2.0 | 2.1 | 2.1 | Arc | 49.1 | 49.6 | 49.4 | 7.1 | 5.5 | 6.3 |
| Example 3 | Roughly parabolic shape | 1.9 | 2.0 | 2.0 | Arc | 53.6 | 54.1 | 53.9 | 6.9 | 5.4 | 6.2 |
| Comparative example 1 | Straight line | 0 | 0 | 0 | Arc | 48.2 | 48.1 | 48.2 | 6.0 | 6.0 | 6.0 |
| Comparative example 2 | Straight line | 0 | 0 | 0 | Arc | 52.5 | 52.3 | 52.4 | 6.1 | 6.2 | 6.2 |
| Comparative example 3 | Straight line | 0 | 0 | 0 | Arc | 57.2 | 57 | 57.1 | 6.1 | 6.1 | 6.1 |

| | Shape of inverted right square pyramid | | | | | | | |
|---|---|---|---|---|---|---|---|---|
| | Cross-sectional shape along AxBx and AyBy of ridgelines | Pitch P of inverted square pyramids | | | Ratio Wr/P of width Wr of curved portion to pitch P | Angle θ formed between inclined portion of inverted right square pyramid and diffusing sheet surface | | |
| | | Px μm | Py μm | Average value P of Px and Py μm | Wr/P % | θx Degrees | θy Degrees | Average value θ of θx and θy Degrees |
| Example 1 | Roughly parabolic shape | 99.2 | 98.8 | 99.0 | 6.0 | 44.9 | 44.7 | 44.8 |
| Example 2 | Roughly parabolic shape | 99.3 | 99.3 | 99.3 | 6.3 | 46.8 | 46.6 | 46.7 |

TABLE 2-continued

| | | | | | | | | |
|---|---|---|---|---|---|---|---|---|
| Example 3 | Roughly parabolic shape | 99.4 | 99.2 | 99.3 | 6.2 | 49.6 | 49.8 | 49.7 |
| Comparative example 1 | Straight line | 99.2 | 99.3 | 99.3 | 6.0 | 44.2 | 44.4 | 44.3 |
| Comparative example 2 | Straight line | 99.2 | 99.6 | 99.4 | 6.2 | 46.6 | 46.8 | 46.7 |
| Comparative example 3 | Straight line | 99.5 | 99.5 | 99.5 | 6.1 | 50.0 | 50.2 | 50.1 |

TABLE 3

| | Optical properties | | Properties assessment | | | | |
|---|---|---|---|---|---|---|---|
| | | | Scratch resistance test | | | | |
| | Haze (incidence of light from surface with inverted square pyramids) % | Light transmittance (450 nm) (incidence of light from surface with inverted square pyramids) % | Inverted square pyramid surface | Matte surface | Brightness uniformity | Brightness | Overall assessment |
| Example 1 | 92.6 | 98.5 | C | AA | B | C | C |
| Example 2 | 92.8 | 101.1 | C | AA | A | B | C |
| Example 3 | 93.0 | 107.7 | C | AA | AA | A | C |
| Comparative example 1 | 92.7 | 98.3 | x | AA | B | C | x |
| Comparative example 2 | 93.0 | 101.0 | x | AA | A | B | x |
| Comparative example 3 | 93.2 | 107.5 | x | AA | AA | A | x |

From the results shown in Table 2 and Table 3, in the first light-diffusing sheet 43 obtained in examples 1 to 3 on which the depressed portions 22 with inverted right square pyramid shapes are formed, the maximum height difference d between a straight line connecting the intersections 23*a* and the ridgelines 23 is 1.0 μm or more and the ridgelines 23 have a shape that is depressed in a roughly parabolic shape between the intersections 23*a*. Therefore, since abrasion and damage attributable to the ridgelines 23 are less likely to occur even when used stacked, the scratch resistance tests produced favorable results.

On the other hand, in comparative examples 1 to 3, while a curved surface shape with a radius of curvature of around 4.2 μm is imparted near the vertex of the ridgelines 23, the maximum height difference d is 0 μm, the ridgelines 23 have no depression whatsoever, and the ridgelines 23 between the intersections 23*a* have a horizontal shape. Therefore, as a result of damage attributable to the ridgelines 23 occurring during the scratch resistance tests, results were poor with respect to scratch resistance.

In addition, in all of example 1 and comparative example 1, example 2 and comparative example 2, and example 3 and comparative example 3, the ratio Wr/P was 10% or lower and since a steep shape of the vertex of the ridgelines 23 is maintained, favorable assessment results comparable to each other were produced with respect to brightness uniformity.

From the above, the overall assessments of examples 1 to 3 were "C" and the overall assessments of comparative examples 1 to 3 were "X".

Examples 4 to 10 and Comparative Example 4

In examples 4 to 7, as shown in Table 4, the light-diffusing sheet was fabricated by the same method as example 1 with the exception of changing the line rate among the molding conditions so as to range from 15 m/minute to 4 m/minute.

In examples 8 to 10 and comparative example 4, as shown in Table 4, the light-diffusing sheet was fabricated by the same method as example 1 with the exception of changing the compressible linear pressure between the two rolls among the molding conditions so as to range from 180 kgf/cm to 40 kgf/cm.

TABLE 4

| | Raw materials | | Molding method/conditions | | | Film | Surface roughness | Target pitch of inverted | Target vertex angle of |
|---|---|---|---|---|---|---|---|---|---|
| | Resin composition | Content of diffusing agent | Molding method | Line rate m/minute | Compressible linear pressure kgf/cm | thickness μm | Ra of matte surface μm | square pyramid μm | inverted square pyramid Degrees |
| Example 4 | 100 | 0 | Extrusion molding | 15 | 280 | 180 | 1.71 | 100 | 90 |
| Example 5 | 100 | 0 | Extrusion molding | 13 | 280 | 180 | 1.69 | 100 | 90 |
| Example 6 | 100 | 0 | Extrusion molding | 11 | 280 | 180 | 1.65 | 100 | 90 |
| Example 7 | 100 | 0 | Extrusion molding | 4 | 280 | 180 | 1.63 | 100 | 90 |
| Example 8 | 100 | 0 | Extrusion molding | 17 | 180 | 180 | 1.61 | 100 | 90 |
| Example 9 | 100 | 0 | Extrusion molding | 17 | 150 | 180 | 1.69 | 100 | 90 |
| Example 10 | 100 | 0 | Extrusion molding | 17 | 100 | 180 | 1.67 | 100 | 90 |
| Comparative example 4 | 100 | 0 | Extrusion molding | 17 | 40 | 180 | 1.65 | 100 | 90 |

Assessment of Examples 4 to 10 and Comparative Example 4

With respect to the first light-diffusing sheet 43 obtained by examples 4 to 10, a shape, dimensions, an angle, and the like of each element obtained by measurement are shown in Table 5 together with comparative example 4, and a measurement result of optical properties, a result of the scratch resistance test, assessment results of brightness and brightness uniformity, and an overall assessment result are shown in Table 6 together with comparative example 4.

TABLE 5

| | Shape of inverted right square pyramid | | | | | | | | | |
|---|---|---|---|---|---|---|---|---|---|---|
| | Cross-sectional shape along AxBx and AyBy of ridgelines | Maximum value d of distance between straight line connecting intersections of ridgelines and ridgelines | | | Vertical cross-sectional shape at center of ridgelines | Height H from center point of inverted square pyramid to highest point of center of ridgelines | | | Widths Wrx and Wry of curved portion of cross section at center of ridgelines | |
| | | dx μm | dy μm | Average value μm | | Hx μm | Hy μm | Average value H of Hx and Hy μm | Wrx μm | Wry μm |
| Example 4 | Roughly parabolic shape | 1.8 | 1.9 | 1.9 | Arc | 45.7 | 45.5 | 45.6 | 7.0 | 6.0 |
| Example 5 | Roughly parabolic shape | 1.9 | 1.9 | 1.9 | Arc | 45.7 | 45.5 | 45.6 | 7.5 | 6.4 |
| Example 6 | Roughly parabolic shape | 2.0 | 2.0 | 2.0 | Arc | 45.1 | 45.4 | 45.3 | 7.4 | 6.7 |
| Example 7 | Roughly parabolic shape | 2.0 | 2.1 | 2.1 | Arc | 40.1 | 40.3 | 40.2 | 18.3 | 17.9 |
| Example 8 | Roughly parabolic shape | 1.9 | 2.0 | 2.0 | Arc | 43.2 | 42.5 | 42.9 | 12.6 | 12.4 |
| Example 9 | Roughly parabolic shape | 1.8 | 1.8 | 1.8 | Arc | 41.5 | 41.2 | 41.4 | 15.5 | 15.7 |
| Example 10 | Roughly parabolic shape | 1.7 | 1.8 | 1.8 | Arc | 38.5 | 38.9 | 38.7 | 25.3 | 24.5 |
| Comparative example 4 | Roughly parabolic shape | 1.6 | 1.7 | 1.7 | Arc | 26.5 | 25.6 | 26.1 | 45.6 | 44.7 |

TABLE 5-continued

| | Shape of inverted right square pyramid | | | | | | | |
|---|---|---|---|---|---|---|---|---|
| | Widths Wrx and Wry of curved portion of cross section at center of ridgelines Average value Wr of W μm | Pitch P of inverted square pyramids Px um | Py um | Average value P of Px and Py Um | Ratio Wr/P of width Wr of curved portion to pitch P Wr/P % | Angle θ formed between inclined portion of inverted right square pyramid and diffusing sheet surface θx Degrees | θy Degrees | Average value θ of θx and θy Degrees |
| Example 4 | 6.5 | 98.8 | 98.8 | 98.8 | 6.6 | 44.5 | 44.8 | 44.7 |
| Example 5 | 7.0 | 99.8 | 99.4 | 99.6 | 7.0 | 44.6 | 44.9 | 44.8 |
| Example 6 | 7.1 | 99.8 | 99.4 | 99.6 | 7.1 | 44.8 | 44.8 | 44.8 |
| Example 7 | 18.1 | 98.9 | 99.2 | 99.1 | 18.3 | 44.7 | 44.9 | 44.8 |
| Example 8 | 12.5 | 98.9 | 99.1 | 99.0 | 12.6 | 44.5 | 44.6 | 44.6 |
| Example 9 | 15.6 | 99.4 | 99.2 | 99.3 | 15.7 | 44.9 | 44.7 | 44.8 |
| Example 10 | 24.9 | 99.5 | 99.4 | 99.5 | 25.0 | 45.1 | 45.2 | 45.2 |
| Comparative example 4 | 45.2 | 99.5 | 99.3 | 99.4 | 45.4 | 45.0 | 45.2 | 45.1 |

TABLE 6

| | Optical properties | | Properties assessment | | | | |
|---|---|---|---|---|---|---|---|
| | Haze (incidence of light from surface with inverted square pyramids) % | Light transmittance (450 nm) (incidence of light from surface with inverted square pyramids) % | Scratch resistance test Inverted square pyramid surface | Matte surface | Brightness uniformity | Brightness | Overall assessment |
| Example 4 | 92.9 | 98.7 | C | AA | B | C | C |
| Example 5 | 93.0 | 98.8 | C | AA | B | C | C |
| Example 6 | 93.1 | 99.0 | C | AA | B | C | C |
| Example 7 | 93.5 | 100.5 | C | AA | C | B | C |
| Example 8 | 93.3 | 99.6 | C | AA | B | C | C |
| Example 9 | 93.4 | 100.1 | C | AA | C | C | C |
| Example 10 | 93.6 | 101.3 | C | AA | C | C | C |
| Comparative example 4 | 93.8 | 105.1 | C | AA | x | B | x |

From the results shown in Table 5 and Table 6, in the first light-diffusing sheet 43 obtained in examples 4 to 10 and comparative example 4 on which the depressed portions 22 with inverted right square pyramid shapes are formed, the maximum height difference d between a straight line connecting the intersections **23*a* and the ridgelines 23 is 1.0 μm or more and the ridgelines 23 have a shape that is depressed in a roughly parabolic shape between the intersections 23*a*. Therefore, since abrasion and damage attributable to the ridgelines 23** are less likely to occur even when used stacked, the scratch resistance tests produced favorable results.

In addition, in examples 4 to 10, the ratio Wr/P was 30% or lower in all of the examples and since a steep shape of the vertex of the ridgelines 23 is maintained, favorable assessment results comparable to each other were produced with respect to brightness uniformity.

However, in comparative example 4, since the ratio Wr/P exceeded 30%, a steep shape of the vertex of the ridgelines 23 is not maintained and a poor result was produced with respect to brightness uniformity.

From the above, the overall assessments of examples 4 to 10 were "C" and the overall assessment of comparative example 4 was "X".

Examples 11 to 14

In a method of manufacturing the first light-diffusing sheet 43 according to example 11, a 200 μm-thick light-diffusing sheet shown in Table 7 was fabricated using more or less the same conditions as example 1 with the exception of using a roll having, on a surface thereof, a shape of a right square pyramid with a height of 90.0 μm, a pitch of 180 μm, and a vertex angle of 90 degrees as the roll with a right square pyramid shape among the two metal rolls.

TABLE 7

| | Raw materials | | Molding method/conditions | | | | Surface roughness | Target pitch of inverted square pyramid | Target vertex angle of inverted square pyramid |
|---|---|---|---|---|---|---|---|---|---|
| | Resin composition | Content of diffusing agent | Molding method | Line rate m/minute | Compressible linear pressure kgf/cm | Film thick-ness μm | Ra of matte surface μm | μm | Degrees |
| Example 11 | 100 | 0 | Extrusion molding | 17 | 250 | 200 | 1.59 | 180 | 90 |
| Example 12 | 100 | 0 | Extrusion molding | 17 | 250 | 200 | 1.61 | 180 | 85 |
| Example 13 | 100 | 0 | Extrusion molding | 17 | 250 | 200 | 1.65 | 180 | 80 |
| Example 14 | 100 | 0 | Extrusion molding | 17 | 250 | 200 | 1.68 | 180 | 75 |
| Example 15 | 100 | 0 | Extrusion molding | 15 | 250 | 200 | 1.64 | 180 | 80 |
| Example 16 | 100 | 0 | Extrusion molding | 13 | 250 | 200 | 1.65 | 180 | 80 |
| Example 17 | 100 | 0 | Extrusion molding | 11 | 250 | 200 | 1.69 | 180 | 80 |
| Comparative example 5 | 100 | 0 | Compression molding | — | — | 200 | 1.66 | 180 | 90 |

In a method of manufacturing the first light-diffusing sheet 43 according to example 12, a 200 μm-thick light-diffusing sheet shown in Table 7 was fabricated using more or less the same conditions as example 1 with the exception of using a roll having, on a surface thereof, a shape of a right square pyramid with a height of 98.2 μm, a pitch of 180 μm, and a vertex angle of 85 degrees as the roll with a right square pyramid shape among the two metal rolls.

In a method of manufacturing the first light-diffusing sheet 43 according to example 13, a 200 μm-thick light-diffusing sheet shown in Table 7 was fabricated using more or less the same conditions as example 1 with the exception of using a roll having, on a surface thereof, a shape of a right square pyramid with a height of 107.3 μm, a pitch of 180 μm, and a vertex angle of 80 degrees as the roll with a right square pyramid shape among the two metal rolls.

In a method of manufacturing the first light-diffusing sheet 43 according to example 14, a 200 μm-thick light-diffusing sheet shown in Table 7 was fabricated using more or less the same conditions as example 1 with the exception of using a roll having, on a surface thereof, a shape of a right square pyramid with a height of 117.3 μm, a pitch of 180 μm, and a vertex angle of 75 degrees as the roll with a right square pyramid shape among the two metal rolls.

Examples 15 to 17 and Comparative Example 5

In examples 15 to 17, a 200 μm-thick light-diffusing sheet was fabricated using the same rolls as in example 13 but by changing the line rate among the molding conditions so as to range from 15 m/minute to 11 m/minute as shown in Table 7.

In comparative example 5, after creating a press original plate in a similar manner to comparative example 1, a 200 μm-thick light-diffusing sheet shown in Table 7 was created by the compression molding method by performing heating, pressing, and cooling under the same conditions as comparative example 1 with the exception of using a flat metal mold having, on a surface thereof, a shape created by rounding, in a similar manner to comparative example 1, a valley portion of a pyramid of a same shape of the right square pyramid as example 11 into a curved surface shape with a radius of curvature of 4.2 μm.

Assessment of Examples 11 to 17 and Comparative Example 5

With respect to the first light-diffusing sheet 43 obtained by examples 11 to 17, a shape, dimensions, an angle, and the like of each element obtained by measurement are shown in Table 8 together with comparative example 5, and a measurement result of optical properties, a result of the scratch resistance test, assessment results of brightness and brightness uniformity, and an overall assessment result are shown in Table 9 together with comparative example 5.

TABLE 8

| | Shape of inverted right square pyramid | | | | | | | | | |
|---|---|---|---|---|---|---|---|---|---|---|
| | Cross-sectional shape along AxBx and AyBy of ridgelines | Maximum value d of distance between straight line connecting intersections of ridgelines and ridgelines | | | Vertical cross-sectional shape at center of ridgelines | Height H from center point of inverted square pyramid to highest point of center of ridgelines | | | Widths Wrx and Wry of curved portion of cross section at center of ridgelines | |
| | | dx μm | dy μm | Average value μm | | Hx μm | Hy μm | Average value H of Hx and Hy μm | Wrx μm | Wry μm |
| Example 11 | Roughly parabolic shape | 3.3 | 3.0 | 3.2 | Arc | 84.9 | 84.0 | 84.5 | 11.1 | 10.6 |
| Example 12 | Roughly parabolic shape | 4.3 | 4.9 | 4.6 | Arc | 89.5 | 89.6 | 89.6 | 11.5 | 10.9 |

TABLE 8-continued

| | | | | | | | | | | |
|---|---|---|---|---|---|---|---|---|---|---|
| Example 13 | Roughly parabolic shape | 3.9 | 4.3 | 4.1 | Arc | 98.4 | 99.3 | 98.9 | 11.1 | 10.6 |
| Example 14 | Roughly parabolic shape | 4.0 | 4.5 | 4.3 | Arc | 109.1 | 108.5 | 108.8 | 11.3 | 10.7 |
| Example 15 | Roughly parabolic shape | 3.5 | 4.6 | 4.1 | Arc | 98.2 | 98.8 | 98.5 | 11.8 | 11.2 |
| Example 16 | Roughly parabolic shape | 3.3 | 4.4 | 3.9 | Arc | 98.5 | 99.2 | 98.9 | 12.0 | 11.3 |
| Example 17 | Roughly parabolic shape | 4.0 | 5.1 | 4.6 | Arc | 98.2 | 98.7 | 98.5 | 14.4 | 13.7 |
| Comparative example 5 | Straight line | 0 | 0 | 0 | Arc | 87.3 | 86.8 | 87.1 | 9.5 | 9.8 |

| | Shape of inverted right square pyramid | | | | | | | |
|---|---|---|---|---|---|---|---|---|
| | Widths Wrx and Wry of curved portion of cross section at center of ridgelines Average | Pitch P of inverted square pyramids | | | Ratio Wr/P of width Wr of curved portion to | Angle θ formed between inclined portion of inverted right square pyramid and diffusing sheet surface | | |
| | value Wr of W µm | Px µm | Py µm | Average value P of Px and Py µm | pitch P Wr/P % | θx Degrees | θy Degrees | Average value θ of θx and θy Degrees |
| Example 11 | 10.9 | 187.2 | 183.7 | 185.5 | 5.9 | 45.0 | 45.2 | 45.1 |
| Example 12 | 11.2 | 187.6 | 186.1 | 186.9 | 6.0 | 47.1 | 47.0 | 47.1 |
| Example 13 | 10.9 | 185.3 | 186.7 | 186.0 | 5.8 | 49.5 | 49.6 | 49.6 |
| Example 14 | 11.0 | 187.4 | 186.7 | 187.1 | 5.9 | 52.1 | 52.3 | 52.2 |
| Example 15 | 11.5 | 188.0 | 188.7 | 188.4 | 6.1 | 49.7 | 49.9 | 49.8 |
| Example 16 | 11.7 | 186.8 | 185.8 | 186.3 | 6.3 | 50.0 | 50.2 | 50.1 |
| Example 17 | 14.1 | 186.4 | 186.7 | 186.6 | 7.5 | 49.6 | 49.8 | 49.7 |
| Comparative example 5 | 9.7 | 185.1 | 185 | 185.1 | 5.2 | 44.8 | 44.9 | 44.9 |

TABLE 9

| | Optical properties | | Properties assessment | | | | |
|---|---|---|---|---|---|---|---|
| | Haze (incidence of light from surface with inverted square pyramids) % | Light transmittance (450 nm) (incidence of light from surface with inverted square pyramids) % | Scratch resistance test | | | | |
| | | | Inverted square pyramid surface | Matte surface | Brightness uniformity | Bright-ness | Overall assessment |
| Example 11 | 92.9 | 97.9 | A | AA | A | C | A |
| Example 12 | 93.1 | 102.0 | A | AA | AA | B | AA |
| Example 13 | 93.3 | 114.4 | A | AA | AA | A | AA |
| Example 14 | 93.4 | 116.0 | A | AA | AA | A | AA |
| Example 15 | 93.6 | 113.1 | A | AA | AA | A | AA |
| Example 16 | 93.9 | 111.2 | A | AA | AA | A | AA |
| Example 17 | 94.1 | 107.8 | A | AA | AA | A | AA |
| Comparative example 5 | 93.0 | 98.1 | X | AA | A | C | x |

From the results shown in Table 8 and Table 9, in the first light-diffusing sheet 43 obtained in examples 11 to 17 on which the depressed portions 22 with inverted right square pyramid shapes are formed, the maximum height difference d between a straight line connecting the intersections 23*a* and the ridgelines 23 is 2.5 µm or more and the ridgelines 23 have a shape that is depressed in a roughly parabolic shape between the intersections 23*a*. Therefore, since abrasion and damage attributable to the ridgelines 23 are even less likely to occur even when used stacked, the scratch resistance tests produced the most favorable results among the examples.

On the other hand, in comparative example 5, although a curved surface shape is imparted near the vertex of the ridgelines 23, the maximum height difference d is 0 µm, the ridgelines 23 have no depression whatsoever, and the ridgelines 23 between the intersections 23*a* have a horizontal shape. Therefore, as a result of damage attributable to the ridgelines 23 occurring during the scratch resistance tests, results were poor with respect to scratch resistance.

In addition, in examples 11 to 17 and comparative example 5, the ratio Wr/P was 10% or lower in all of the examples and the comparative example and since a steeper shape of the vertex of the ridgelines 23 is maintained, particularly favorable assessment results were produced with respect to brightness uniformity. In particular, in examples 11 to 17, since the maximum height difference d is 5.0 μm or less, a decline in brightness uniformity attributable to the ridgelines 23 having a depressed shape between the intersections 23*a* was not observed.

From the above, the overall assessment of example 11 was "A", the overall assessments of examples 12 to 17 were "AA" representing highest scores, and the overall assessment of comparative example 5 was "X".

Examples 18 to 23

In example 18, a 180 μm-thick light-diffusing sheet shown in Table 10 was fabricated using the same conditions as example 1 with the exception of feeding a mixture having been prepared in advance of 1 part by mass of a silicone composite powder (average particle size 2.0 μm) as a diffusing agent per 99 parts by mass of the aromatic polycarbonate resin used in example 1 into an extruder and performing melting and kneading.

TABLE 10

| | Raw materials | | Molding method/conditions | | | | Surface | Target pitch of | Target vertex angle of |
|---|---|---|---|---|---|---|---|---|---|
| | Resin composition | Content of diffusing agent | Molding method | Line rate m/minute | Compressible linear pressure kgf/cm | Film thickness μm | roughness Ra of matte surface μm | inverted square pyramid μm | inverted square pyramid Degrees |
| Example 18 | 99.0 | 1.0 | Extrusion molding | 17 | 280 | 180 | 1.65 | 100 | 90 |
| Example 19 | 99.0 | 1.0 | Extrusion molding | 15 | 280 | 180 | 1.69 | 100 | 90 |
| Example 20 | 99.0 | 1.0 | Extrusion molding | 14 | 280 | 180 | 1.68 | 100 | 90 |
| Example 21 | 99.0 | 1.0 | Extrusion molding | 12 | 280 | 180 | 1.64 | 100 | 90 |
| Example 22 | 99.0 | 1.0 | Extrusion molding | 11 | 280 | 180 | 1.67 | 100 | 90 |
| Example 23 | 99.0 | 1.0 | Extrusion molding | 9 | 280 | 180 | 1.63 | 100 | 90 |

In examples 19 to 23, a 180 μm-thick light-diffusing sheet was fabricated using the same method as in example 18 but by changing the line rate among the molding conditions so as to range from 15 m/minute to 9 m/minute as shown in Table 10.

Assessment of Examples 18 to 23

With respect to the first light-diffusing sheet 43 obtained by examples 18 to 23, a shape, dimensions, an angle, and the like of each element obtained by measurement are shown in Table 11 and a measurement result of optical properties, a result of the scratch resistance test, assessment results of brightness and brightness uniformity, and an overall assessment result are shown in Table 12.

TABLE 11

| | Shape of inverted right square pyramid | | | | | | | | | | |
|---|---|---|---|---|---|---|---|---|---|---|---|
| | Cross-sectional shape along AxBx and AyBy of ridgelines | Maximum value d of distance between straight line connecting intersections of ridgelines and ridgelines | | | Vertical cross-sectional shape at center of ridgelines | Height H from center point of inverted square pyramid to highest point of center of ridgelines | | | Widths Wrx and Wry of curved portion of cross section at center of ridgelines | | |
| | | dx μm | dy μm | Average value μm | | Hx μm | Hy μm | Average value H of Hx and Hy μm | Wrx μm | Wry μm | Average value Wr of W μm |
| Example 18 | Roughly parabolic shape | 1.5 | 1.7 | 1.6 | Arc | 46.2 | 46.2 | 46.2 | 7.0 | 5.3 | 6.2 |
| Example 19 | Roughly parabolic shape | 1.5 | 1.7 | 1.6 | Arc | 45.8 | 46.1 | 46.0 | 7.5 | 5.7 | 6.6 |
| Example 20 | Roughly parabolic shape | 1.5 | 2.1 | 1.8 | Arc | 45.7 | 46.4 | 46.1 | 8.0 | 5.9 | 7.0 |

TABLE 11-continued

| | | | | | | | | | | | |
|---|---|---|---|---|---|---|---|---|---|---|---|
| Example 21 | Roughly parabolic shape | 2.0 | 1.9 | 2.0 | Arc | 45.9 | 46.1 | 46.0 | 10.1 | 7.2 | 8.7 |
| Example 22 | Roughly parabolic shape | 2.1 | 1.9 | 2.0 | Arc | 42.1 | 43.2 | 42.7 | 9.1 | 6.6 | 7.9 |
| Example 23 | Roughly parabolic shape | 2.4 | 2.4 | 2.4 | Arc | 43.6 | 44.2 | 43.9 | 14.4 | 10.8 | 12.6 |

| | Shape of inverted right square pyramid | | | | | | |
|---|---|---|---|---|---|---|---|
| | Pitch P of inverted square pyramids | | | Ratio Wr/P of width Wr of curved portion to pitch P | Angle θ formed between inclined portion of inverted right square pyramid and diffusing sheet surface | | |
| | Px μm | Py μm | Average value P of Px and Py μm | Wr/P % | θx Degrees | θy Degrees | Average value θ of θx and θy Degrees |
| Example 18 | 99.6 | 100 | 99.8 | 6.2 | 44.2 | 44.6 | 44.4 |
| Example 19 | 99.4 | 99.1 | 99.3 | 6.6 | 44.8 | 44.9 | 44.9 |
| Example 20 | 99.0 | 98.4 | 98.7 | 7.0 | 44.9 | 44.8 | 44.9 |
| Example 21 | 100 | 98.3 | 99.2 | 8.7 | 45.1 | 45.2 | 45.2 |
| Example 22 | 99.2 | 99.5 | 99.4 | 7.9 | 45.2 | 45.2 | 45.2 |
| Example 23 | 98.4 | 98.6 | 98.5 | 12.8 | 45.1 | 45.0 | 45.1 |

TABLE 12

| | Optical properties | | Properties assessment | | | | |
|---|---|---|---|---|---|---|---|
| | | | Scratch resistance test | | | | |
| | Haze (incidence of light from surface with inverted square pyramids) % | Light transmittance (450 nm) (incidence of light from surface with inverted square pyramids) % | Inverted square pyramid surface | Matte surface | Brightness uniformity | Brightness | Overall assessment |
| Example 18 | 94.5 | 89.0 | B | AA | C | B | C |
| Example 19 | 94.3 | 89.4 | B | AA | C | B | C |
| Example 20 | 94.4 | 89.6 | B | AA | C | B | C |
| Example 21 | 94.4 | 90.1 | B | AA | C | B | C |
| Example 22 | 94.3 | 90.2 | B | AA | C | B | C |
| Example 23 | 94.4 | 90.3 | B | AA | C | B | C |

From the results shown in Table 11 and Table 12, in the first light-diffusing sheet 43 obtained in examples 18 to 23 on which the depressed portions 22 with inverted right square pyramid shapes are formed, the maximum height difference d between a straight line connecting the intersections 23*a* and the ridgelines 23 is 1.6 μm or more and the ridgelines 23 have a shape that is depressed in a roughly parabolic shape between the intersections 23*a*. Therefore, since abrasion and damage attributable to the ridgelines 23 are less likely to occur even when used stacked, the scratch resistance tests produced favorable results.

In addition, in examples 18 to 23, the ratio Wr/P was within a range of 6 to 13% and since a steep shape of the vertex of the ridgelines 23 is maintained, favorable assessment results were produced with respect to brightness uniformity.

From the above, the overall assessments of examples 18 to 23 were "C".

Examples 24 to 27

Figure 17:
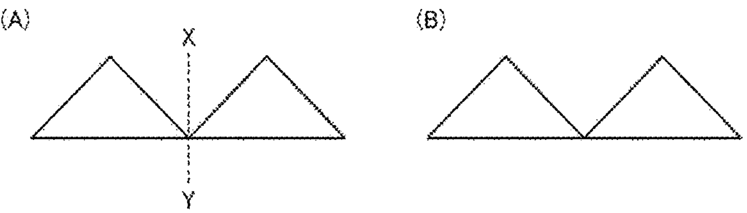
FIG. 17 is a diagram showing a shape of a right square pyramid on a roll used to manufacture a light-diffusing sheet in the examples.

In example 24, a 120 μm-thick light-diffusing sheet shown in Table 13 was fabricated using the aromatic polycarbonate resin used in example 1 and the molding conditions shown in Table 13, using a roll having, on a surface thereof, a shape (a shape of a right square pyramid with a height of 50 μm, a pitch of 100 μm, and a vertex angle of 90 degrees) shown in (A) and (B) in FIG. 17 as one of two metal rolls, and using a roll having, on a surface thereof, a random matte shape (surface roughness Ra=1.6 μm) as the other roll.

| | Raw materials | | Molding method/conditions | | | | Surface roughness Ra of matte surface µm | Target pitch of inverted square pyramid µm | Target vertex angle of inverted square pyramid Degrees |
|---|---|---|---|---|---|---|---|---|---|
| | Resin composition | Content of diffusing agent | Molding method | Line rate m/minute | Compressible linear pressure kgf/cm | Film thickness µm | | | |
| Example 24 | 100.0 | 0.0 | Extrusion molding | 15 | 280 | 120 | 1.10 | 100 | 90 |
| Example 25 | 99.0 | 1.0 | Extrusion molding | 15 | 280 | 120 | 1.12 | 100 | 90 |
| Example 26 | 100.0 | 0.0 | Extrusion molding | 12 | 280 | 200 | 1.14 | 180 | 80 |
| Example 27 | 99.0 | 1.0 | Extrusion molding | 12 | 280 | 200 | 1.09 | 100 | 90 |

In example 25, a 120 µm-thick light-diffusing sheet shown in Table 13 was fabricated using the same diffusing agent-containing aromatic polycarbonate resin as in example 18, the molding conditions shown in Table 13, and the same two metal rolls as in example 24.

In example 26, a 200 µm-thick light-diffusing sheet shown in Table 13 was fabricated using the same aromatic polycarbonate resin as in example 24, the molding conditions shown in Table 13, using the roll having, on a surface thereof, a shape of a right square pyramid with a height of 107.3 µm, a pitch of 180 µm, and a vertex angle of 80 degrees used in example 13 as one of two metal rolls, and using a roll having, on a surface thereof, a random matte shape (surface roughness Ra=2.0 µm) as the other roll.

In example 27, a 200 µm-thick light-diffusing sheet shown in Table 13 was fabricated using the same diffusing agent-containing aromatic polycarbonate resin as in example 25, the molding conditions shown in Table 13, using the same roll having, on a surface thereof, a shape of a right square pyramid as in examples 24 and 25 as one of two metal rolls, and using a roll having, on a surface thereof, a random matte shape (surface roughness Ra=2.0 µm) as the other roll.

Assessment of Examples 24 to 27

With respect to the first light-diffusing sheet 43 obtained by examples 24 to 27, a shape, dimensions, an angle, and the like of each element obtained by measurement are shown in Table 14 and a measurement result of optical properties, a result of the scratch resistance test, assessment results of brightness and brightness uniformity, and an overall assessment result are shown in Table 15. In addition, surface photographs of samples after the scratch resistance test in each of examples 24 to 27 and comparative example 1 or, more specifically, surface photographs of the lower surface (inverted square pyramid surface) of the fixed sample and the upper surface (matte surface) of the moved sample are shown in FIG. 19.

TABLE 14

| | Shape of inverted right square pyramid | | | | | | | | | | | |
|---|---|---|---|---|---|---|---|---|---|---|---|---|
| | Cross-sectional shape along AxBx and AyBy of ridgelines | Maximum value d of distance between straight line connecting intersections of ridgelines and ridgelines | | | Vertical cross-sectional shape at center of ridgelines | Height H from center point of inverted square pyramid to highest point of center of ridgelines | | | Widths Wrx and Wry of curved portion of cross section at center of ridgelines | | | |
| | | dx µm | dy µm | Average value µm | | Hx µm | Hy µm | Average value H of Hx and Hy µm | Wrx µm | Wry µm | Average value Wr of W µm |
| Example 24 | Roughly parabolic shape | 2.9 | 3.1 | 3.0 | Arc | 44.3 | 44.5 | 44.4 | 10.0 | 10.2 | 10.1 |
| Example 25 | Roughly parabolic shape | 2.8 | 3.0 | 2.9 | Arc | 44.2 | 44.4 | 44.3 | 10.4 | 10.6 | 10.5 |
| Example 26 | Roughly parabolic shape | 3.1 | 3.3 | 3.2 | Arc | 101 | 101 | 101 | 9.0 | 9.0 | 9.0 |
| Example 27 | Roughly parabolic shape | 2.5 | 2.5 | 2.5 | Arc | 44.6 | 44.5 | 44.6 | 10.4 | 10.8 | 10.6 |

TABLE 14-continued

| | Shape of inverted right square pyramid | | | | | | |
|---|---|---|---|---|---|---|---|
| | Pitch P of inverted square pyramids | | | Ratio Wr/P of width Wr of curved portion to pitch P | Angle θ formed between inclined portion of inverted right square pyramid and diffusing sheet surface | | |
| | Px µm | Py µm | Average value P of Px and Py µm | Wr/P % | θx Degrees | θy Degrees | Average value θ of θx and θy Degrees |
| Example 24 | 99.3 | 99.4 | 99.4 | 10.2 | 45.0 | 45.1 | 45.1 |
| Example 25 | 99.4 | 99.4 | 99.4 | 10.6 | 45.2 | 45.3 | 45.3 |
| Example 26 | 186 | 186 | 186.0 | 4.8 | 48.6 | 48.6 | 48.6 |
| Example 27 | 99.4 | 99.4 | 99.4 | 10.7 | 45.0 | 45.2 | 45.1 |

TABLE 15

| | Optical properties | | Properties assessment | | | | |
|---|---|---|---|---|---|---|---|
| | | | Scratch resistance test | | | | |
| | Haze (incidence of light from surface with inverted square pyramids) % | Light transmittance (450 nm) (incidence of light from surface with inverted square pyramids) % | Inverted square pyramid surface | Matte surface | Brightness uniformity | Brightness | Overall assessment |
| Example 24 | 93.5 | 96.9 | A | AA | A | A | A |
| Example 25 | 94.5 | 92.6 | A | AA | C | B | C |
| Example 26 | 93.9 | 113 | A | AA | AA | A | AA |
| Example 27 | 94.5 | 89.9 | A | AA | C | B | C |

From the results shown in Table 14 and Table 15, in the first light-diffusing sheet 43 obtained in examples 24 to 27 on which the depressed portions 22 with inverted right square pyramid shapes are formed, the maximum height difference d between a straight line connecting the intersections 23*a* and the ridgelines 23 is 2.7 µm or more and the ridgelines 23 have a shape that is depressed in a roughly parabolic shape between the intersections 23*a*. Therefore, since abrasion and damage attributable to the ridgelines 23 are less likely to occur even when used stacked, as shown in FIG. 19, the scratch resistance tests produced favorable results not only with respect to the matte surface (upper surface of the moved sample) but also with respect to the inverted square pyramid surface (lower surface of the fixed sample). On the other hand, as shown in FIG. 19, in comparative example 1, as described earlier (refer to Table 2 and the like), since the maximum height difference d is 0 µm, there is absolutely no depression of the ridgelines 23, and the ridgelines 23 have a horizontal shape between the intersections 23*a*, damage attributable to the ridgelines 23 have clearly occurred during the scratch resistance test on the inverted square pyramid surface (lower surface of the fixed sample), resulting in poor scratch resistance.

Note that in examples 24 and 25, relatively large depressions have occurred in the ridgelines 23 due to the thickness of the first light-diffusing sheet 43 being relatively thin and, in example 26, relatively large depressions have occurred in the ridgelines 23 due to the inverted square pyramids of the depressed portions 22 being relatively large.

In addition, in examples 24 to 27, the ratio Wr/P was within a range of around 5 to 11% and since a steep shape of the vertex of the ridgelines 23 is maintained, favorable assessment results were produced with respect to brightness uniformity.

From the above, the overall assessment of example 24 was "A", the overall assessments of examples 25 and 27 were "C", and the overall assessment of example 26 was "AA" representing a highest score.

<Assessment of Shape of Vertex of Inverted Square Pyramids (Depressed Portions)>

Table 16 shows a result of examining a shape of a vertex of each of the inverted square pyramids with respect to five samples S1 to S5 with different inverted square pyramid shapes of the depressed portions 22 among the first light-diffusing sheets 43 according to the examples described above.

TABLE 16

| | X-direction | | | | | Y-direction | | | | |
|---|---|---|---|---|---|---|---|---|---|---|
| | S1 | S2 | S3 | S4 | S5 | S1 | S2 | S3 | S4 | S5 |
| Vertex has dot shape | 30% | 40% | 34% | 45% | 13% | 24% | 37% | 42% | 46% | 19% |
| Vertex has linear shape | 70% | 60% | 66% | 56% | 88% | 76% | 63% | 58% | 54% | 81% |

As shown in Table 16, in each of the samples S1 to S5, it was found that 50% or more of the vertexes of the inverted right square pyramids were formed in a linear shape in both the X-direction and the Y-direction (refer to FIG. 15). In other words, it was found that, in the first light-diffusing sheet 43 according to the examples, the plurality of depressed portions 22 include the depressed portion 22 of which the vertex of the inverted square pyramid is formed in a dot shape and the depressed portion 22 of which the vertex of the inverted square pyramid is formed in a linear shape.

<Occurrence Rate of Linear Vertexes of Inverted Square Pyramids (Depressed Portions)>

Figure 21:
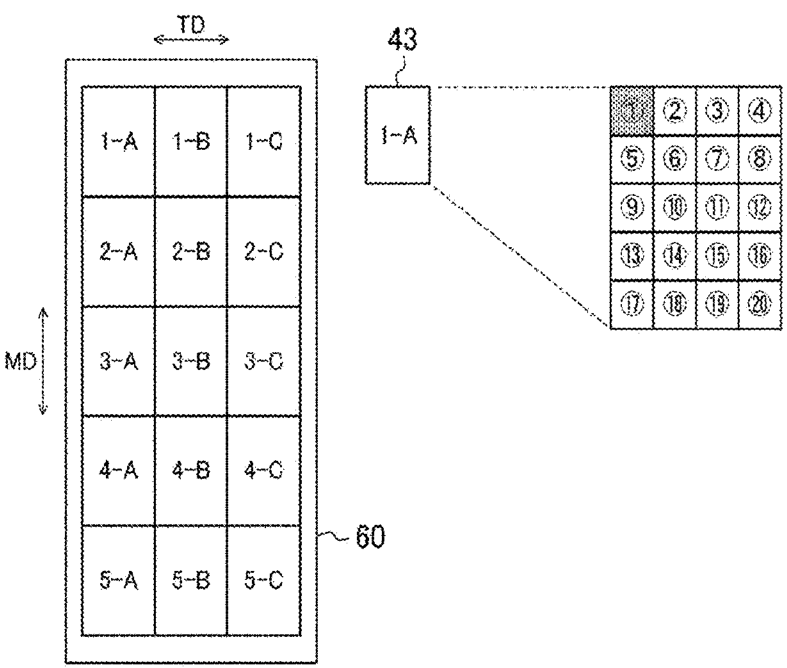
FIG. 21 is a diagram for explaining a method of examining a rate of occurrence of a linear vertex in depressed portions formed on a light-diffusing sheet in the examples.

A rate at which the vertex of the inverted square pyramids is formed in a linear shape (an occurrence rate of linear vertexes) in the plurality of depressed portions 22 provided on the first light-diffusing sheet 43 was examined by a method shown in FIG. 21 using three pyramid rolls (rolls having shapes of a right square pyramid on a surface thereof) with the same design dimensions. Specifically, pyramid rolls in which right square pyramids (pyramid shapes) with a height of 50 μm and a vertex angle of 90 degrees are two-dimensionally arrayed on a surface thereof at a pitch of 100 μm were used. As the other roll, a roll having a random matte shape (surface roughness Ra=2.5 μm) on a surface thereof was used. In addition, as shown in FIG. 21, 15 (5 (MD direction or roll rotation direction)×3 (TD direction or width direction)) samples of the first light-diffusing sheet 43 in a tablet size (length in MD direction: 267 mm, and length in TD direction: 200 mm) are extracted from a base material sheet corresponding to one circumference of the pyramid rolls and numbers (1A to 5A, 1B to 5B, and 1C to 5C) were assigned to the respective samples. Furthermore, each sample was partitioned into 20 regions (5 (MD direction)×4 (TD direction)) with a size of approximately 50 mm×50 mm and, with respect to each region, shapes of vertexes of any six adjacent depressed portions 22 were examined.

Tables 17 to 19 show a result of examining an occurrence rate of linear vertexes with respect to the 15 samples respectively fabricated using the three pyramid rolls (hereinafter, also referred to as first to third rolls). In addition, tables 20 to 21 show a result of examining an occurrence rate by dividing the linear vertexes into those with a dimension of 1.0 μm or less and those with a dimension of more than 1.0 μm with respect to the samples fabricated using the first roll and the third roll.

Measurement of dimensions of the vertexes of the inverted square pyramids (bottom portions of the depressed portions 22) was performed using Shape Measurement Laser Microscope VK-X110 of the 3D Laser Scanning Confocal Microscope VK-X series manufactured by KEYENCE CORPORATION (and analysis application version 3.6.1.0 manufactured by the same manufacturer as analysis software). Specifically, a shape profile of a cross section which passes through a vertex of an inverted square pyramid (a bottom portion of the depressed portion 22) and which is orthogonal to the ridgelines 23 of the depressed portions 22 was measured with respect to each of the X-direction and the Y-direction (refer to FIG. 15) and the dimensions of the vertex was determined from the obtained shape profiles. In addition, when one of the X-direction dimension and the Y-direction dimension of the vertex of the inverted square pyramid was 0.1 μm or more and the other was less than 0.1 μm, the vertex was determined to be a linear vertex and the longer dimension was adopted as the dimension of the linear vertex. On the other hand, when both the X-direction dimension and the Y-direction dimension were less than 0.1 μm, the vertex was determined to be a dot-shaped vertex even if the X-direction dimension and the Y-direction dimension differed from each other.

TABLE 17

| | | TD | | |
|---|---|---|---|---|
| | | A | B | C |
| MD | 1 | 100% | 100% | 95% |
| | 2 | 100% | 58% | 13% |
| | 3 | 93% | 29% | 43% |
| | 4 | 67% | 65% | 88% |
| | 5 | 74% | 61% | 53% |

TABLE 18

| | | TD | | |
|---|---|---|---|---|
| | | A | B | C |
| MD | 1 | 78% | 100% | 98% |
| | 2 | 100% | 100% | 100% |
| | 3 | 100% | 100% | 100% |
| | 4 | 100% | 100% | 100% |
| | 5 | 100% | 100% | 100% |

TABLE 19

| | | TD | | |
|---|---|---|---|---|
| | | A | B | C |
| MD | 1 | 95% | 67% | 34% |
| | 2 | 19% | 35% | 93% |
| | 3 | 55% | 23% | 73% |
| | 4 | 59% | 20% | 73% |
| | 5 | 95% | 60% | 31% |

TABLE 20

| | Dot shape | 1.0 mm or less | More than 1.0 mm |
|---|---|---|---|
| 1-A | 0.0% | 0.0% | 100.0% |
| 2-A | 0.0% | 4.2% | 95.8% |
| 3-A | 7.5% | 27.5% | 65.0% |
| 4-A | 33.3% | 42.5% | 24.2% |
| 5-A | 25.8% | 24.2% | 50.0% |
| 1-B | 0.0% | 3.3% | 96.7% |
| 2-B | 41.7% | 30.8% | 27.5% |
| 3-B | 70.8% | 22.5% | 6.7% |
| 4-B | 35.0% | 44.2% | 20.8% |

TABLE 20-continued

| | Dot shape | 1.0 mm or less | More than 1.0 mm |
|---|---|---|---|
| 5-B | 39.2% | 40.0% | 20.8% |
| 1-C | 5.0% | 10.0% | 85.0% |
| 2-C | 87.5% | 11.7% | 0.8% |
| 3-C | 57.5% | 35.0% | 7.5% |
| 4-C | 11.7% | 38.3% | 50.0% |
| 5-C | 47.5% | 33.3% | 19.2% |

TABLE 21

| | Dot shape | 1.0 mm or less | More than 1.0 mm |
|---|---|---|---|
| 1-A | 5.0% | 52.5% | 42.5% |
| 2-A | 80.8% | 19.2% | 0.0% |
| 3-A | 45.0% | 45.8% | 9.2% |
| 4-A | 40.8% | 44.2% | 15.0% |
| 5-A | 5.0% | 36.7% | 58.3% |
| 1-B | 33.3% | 55.0% | 11.7% |
| 2-B | 65.0% | 32.5% | 2.5% |
| 3-B | 76.7% | 19.2% | 4.2% |
| 4-B | 80.0% | 18.3% | 1.7% |
| 5-B | 40.0% | 38.3% | 21.7% |
| 1-C | 65.8% | 29.2% | 5.0% |
| 2-C | 6.7% | 64.2% | 29.2% |
| 3-C | 27.5% | 55.8% | 16.7% |
| 4-C | 26.7% | 46.7% | 26.7% |
| 5-C | 69.2% | 30.0% | 0.8% |

As shown in Tables 17 to 19, regardless of which pyramid roll was used, the ratio of depressed portions 22 of which the vertex 22*b* is formed in a linear shape among the plurality of depressed portions 22 or, in other words, the occurrence rate of linear vertexes was 10% or more.

Specifically, when using the first roll, as shown in Table 17, the occurrence rate of linear vertexes was 20% or more in all but one sample, the occurrence rate of linear vertexes was 40% or more in many samples, the occurrence rate of linear vertexes was 60% or more in a majority of the samples, and the occurrence rate of linear vertexes was 80% or more in almost half of the samples. In addition, when using the first roll, as shown in Table 20, the occurrence rate of linear vertexes with a dimension of more than 1.0 μm was 50% or more in almost half of the samples.

When using the second roll, as shown in Table 18, the occurrence rate of linear vertexes was 70% or more in all of the samples, the occurrence rate of linear vertexes was 90% or more in all but one sample, and the occurrence rate of linear vertexes was 100% in a majority of the samples.

When using the third roll, as shown in Table 19, the occurrence rate of linear vertexes was 30% or more in many samples and the occurrence rate of linear vertexes was 50% or more in a majority of the samples. In addition, when using the third roll, as shown in Table 21, the occurrence rate of linear vertexes with a dimension of more than 1.0 μm was 50% or more in one sample.

From the results described above, it was found that when the vertex 22*b* of the depressed portions 22 is formed in a linear shape, mass production of the first light-diffusing sheet 43 of which brightness uniformity is prevented from declining can be readily performed.

Note that the vertex 22*b* of the depressed portions 22 may be formed in a rectangular shape instead of being formed in a linear shape. Specifically, the "vertex 22*b* of the depressed portions 22 being a rectangular shape" means that the X-direction dimension and the Y-direction dimension of the vertex of the inverted square pyramid differ from each other and both dimensions are 0.1 μm or more. In this case, a dimensional difference between the X-direction dimension and the Y-direction dimension may be 10% or more of the longer dimension. Alternatively, the dimensional difference may be 20% or more, 30% or more, 40% or more, 50% or more, 60% or more, 70% or more, 80% or more, or 90% or more of the longer dimension. In addition, from the perspective of suppressing a decline in uniformity, the longer dimension of the X-direction dimension and the Y-direction dimension is preferably 10 μm or less, more preferably 5 μm or less, even more preferably 3 μm or less, and most preferably 2 μm or less.

Other Embodiments

While an embodiment (including examples: the same applies hereinafter) of the present disclosure has been described above, the present disclosure is not solely limited to the embodiment described above and various modifications can be made within the scope of the disclosure. In other words, the foregoing description of the embodiment is illustrative in nature and is not intended to limit the present disclosure, its applications, or its uses. For example, it is needless to say that a configuration (layer structure, material, and the like) of a light-diffusing sheet is not limited to the configuration of the first light-diffusing sheet 43 according to the embodiment described above. In addition, it is needless to say that a configuration of a backlight to which the light-diffusing sheet is applied and a configuration of a liquid crystal display device including the backlight are also not limited to the configurations of the backlight unit 40 and the liquid crystal display device 50 according to the embodiment described above.

Figure 20:
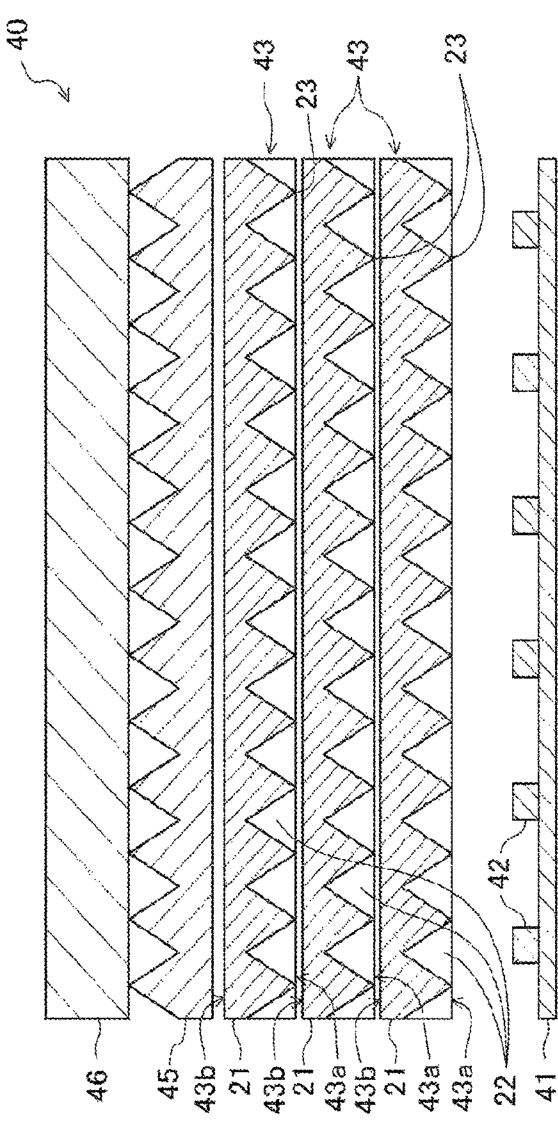
FIG. 20 is a sectional view of a backlight unit according to a modification.

For example, instead of the combination of a stack of two sheets of the first light-diffusing sheet 43 and the second light-diffusing sheet 44 in the backlight unit 40 according to the embodiment described above and shown in FIG. 2, a stack of three sheets of the first light-diffusing sheet 43 may be used as in the modification shown in FIG. 20 or four or more sheets of the first light-diffusing sheet 43 may be stacked. When stacking three or more sheets of the first light-diffusing sheet 43, from the perspective of a trade-off between an effect of reflection and refraction by the approximately inverted polygonal pyramid shapes and a light-diffusing effect by the diffusing agent, the light-diffusing sheet 43 nearest to the display screen 50*a* (in other words, the first prism sheet 45) may contain a diffusing agent and the other light-diffusing sheets 43 substantially need not contain the diffusing agent. Accordingly, brightness uniformity can be even further improved.

The invention claimed is:

1. A light-diffusing sheet including a plurality of depressed portions formed in an approximately inverted polygonal pyramid on at least a first surface, wherein ridgelines that partition the plurality of depressed portions each have a depressed shape between intersections of the ridgelines with respect to straight lines that connect the intersections, when an array pitch of the plurality of depressed portions is denoted by P and a dimension occupied by a curved portion of a vertex of each of the ridgelines in an array direction of the plurality of depressed portions is denoted by Wr, a ratio Wr/P is 0.3 or lower, a maximum height difference d between the straight lines and the ridgelines is 1 μm or more and 10 μm or less, and the plurality of depressed portions include a depressed portion of which a vertex of the approximately inverted polygonal pyramid is formed in a linear shape.

2. The light-diffusing sheet according to claim 1, wherein the maximum height difference d is 1.5 μm or more and 7 μm or less.

3. The light-diffusing sheet according to claim 2, wherein the maximum height difference d is 2.5 μm or more and 5 μm or less.

4. The light-diffusing sheet according to claim 1, wherein the ratio Wr/P is 0.2 or lower.

5. The light-diffusing sheet according to claim 4, wherein the ratio Wr/P is 0.1 or lower.

6. The light-diffusing sheet according to claim 1, wherein the array pitch P is 50 μm or more and 500 μm or less, and an angle formed between a wall surface of the plurality of depressed portions and a sheet surface of the light-diffusing sheet is 40 degrees or more and 65 degrees or less.

7. The light-diffusing sheet according to claim 1, wherein the ridgelines are each depressed in an approximately parabolic shape, an approximately arc shape, an approximately triangular shape, or an approximately trapezoidal shape between the intersections.

8. The light-diffusing sheet according to claim 1, wherein the plurality of depressed portions are formed in an approximately inverted square pyramid, the ridgelines each extend in a first direction and a second direction, the maximum height difference d is an average value of a maximum height difference dx between the straight lines and the ridgelines in the first direction and a maximum height difference dy between the straight lines and the ridgelines in the second direction, the array pitch P is an average value of an array pitch Px of the plurality of depressed portions in the first direction and an array pitch Py of the plurality of depressed portions in the second direction, and the dimension Wr is an average value of a dimension Wrx occupied by a curved portion of a vertex of each of the ridgelines in the first direction and a dimension Wry occupied by a curved portion of a vertex of each of the ridgelines in the second direction.

9. The light-diffusing sheet according to claim 1, wherein the plurality of depressed portions are only provided on the first surface, and a second surface is a matte surface.

10. The light-diffusing sheet according to claim 1, wherein a ratio of depressed portions of which the vertexes are formed in a linear shape among the plurality of depressed portions is 10% or more.

11. A backlight unit which is built into a liquid crystal display device and which guides light emitted by a light source toward a display screen, the backlight unit comprising:

the light-diffusing sheet according to claim 1 between the display screen and the light source.

12. The backlight unit according to claim 11, wherein the light source is arranged on a reflecting sheet provided on an opposite side to the display screen as viewed from the light-diffusing sheet.

13. The backlight unit according to claim 11, wherein a plurality of the light-diffusing sheets are stacked and arranged between the display screen and the light source.

14. The backlight unit according to claim 13, wherein three or more sheets of the light-diffusing sheets are stacked and arranged between the display screen and the light source.

15. The backlight unit according to claim 14, wherein in the three or more stacked light-diffusing sheets, a light-diffusing sheet nearest to the display screen contains a diffusing agent but the other light-diffusing sheets substantially do not contain the diffusing agent.

16. A liquid crystal display device, comprising:

the backlight unit according to claim 11; and a liquid crystal display panel.

17. An information apparatus, comprising:

the liquid crystal display device according to claim 16.

18. A method of manufacturing the light-diffusing sheet according to claim 1, wherein the light-diffusing sheet is subjected to extrusion molding at a line rate of 10 m/minute or more and 30 m/minute or less and compressible linear pressure of 100 kgf/cm or more and 500 kgf/cm or less.

19. A light-diffusing sheet including a plurality of depressed portions formed in an approximately inverted polygonal pyramid on at least a first surface, wherein ridgelines that partition the plurality of depressed portions have a depressed shape between intersections of the ridgelines with respect to straight lines that connect the intersections, when an array pitch of the plurality of depressed portions is denoted by P and a dimension occupied by a curved portion of a vertex of each of the ridgelines in an array direction of the plurality of depressed portions is denoted by Wr, a ratio Wr/P is 0.3 or lower, a maximum height difference d between the straight line and each of the ridgelines is 1 μm or more and 10 μm or less, and the plurality of depressed portions include a depressed portion of which a vertex of the approximately inverted polygonal pyramid is formed in a rectangular shape.

* * * * *